(12) United States Patent
Meenakshi Sundaram Gandhi et al.

(10) Patent No.: US 12,405,397 B2
(45) Date of Patent: Sep. 2, 2025

(54) SEISMIC SURVEY DATA ACCESS

(71) Applicant: Schlumberger Technology Corporation, Sugar Land, TX (US)

(72) Inventors: Praveen Kumar Meenakshi Sundaram Gandhi, Houston, TX (US); Markus Schlafli, Oxfordshire (GB); Abhishek Gupta, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 174 days.

(21) Appl. No.: 18/259,873

(22) PCT Filed: Dec. 16, 2021

(86) PCT No.: PCT/US2021/063736
§ 371 (c)(1),
(2) Date: Jun. 29, 2023

(87) PCT Pub. No.: WO2022/146702
PCT Pub. Date: Jul. 7, 2022

(65) Prior Publication Data
US 2024/0069234 A1    Feb. 29, 2024

Related U.S. Application Data

(60) Provisional application No. 63/132,945, filed on Dec. 31, 2020.

(51) Int. Cl.
*G01V 1/34* (2006.01)
*G01V 1/30* (2006.01)

(52) U.S. Cl.
CPC .................. *G01V 1/34* (2013.01); *G01V 1/30* (2013.01); *G01V 1/301* (2013.01); *G01V 2210/63* (2013.01); *G01V 2210/64* (2013.01); *G01V 2210/74* (2013.01)

(58) Field of Classification Search
USPC ............................................................ 702/16
See application file for complete search history.

(56) References Cited

U.S. PATENT DOCUMENTS

| 6,675,102 B1 * | 1/2004 | Baker, III | G01V 1/301 |
| | | | 702/14 |
| 2004/0243313 A1* | 12/2004 | Broto | G01V 1/303 |
| | | | 702/18 |
| 2005/0114831 A1 | 5/2005 | Callegari et al. | |
| 2007/0234230 A1 | 10/2007 | Pedersen | |

(Continued)

OTHER PUBLICATIONS

Extended European Search Report of European Patent Application No. 21916208.8 dated on Nov. 12, 2024; 11 pages.

(Continued)

*Primary Examiner* — Paul D Lee
(74) *Attorney, Agent, or Firm* — Jeffrey D. Frantz

(57) ABSTRACT

A method can include receiving a request for loading a seismic volume; determining a loading order for portions of the seismic volume, where the loading order prioritizes an interior portion of the seismic volume over a boundary portion of the seismic volume; and transmitting, via a network interface, at least one of the portions of the seismic volume according to the loading order.

20 Claims, 14 Drawing Sheets

(56) References Cited

U.S. PATENT DOCUMENTS

| | | | |
|---|---|---|---|
| 2008/0212841 A1* | 9/2008 | Gauthier | G01V 1/32 382/109 |
| 2009/0142041 A1* | 6/2009 | Nagasawa | H04N 19/44 348/42 |
| 2011/0054857 A1 | 3/2011 | Moguchaya | |
| 2018/0040164 A1 | 2/2018 | Newman et al. | |
| 2022/0163690 A1* | 5/2022 | Eick | G01V 1/28 |

OTHER PUBLICATIONS

Search Report and Written Opinion of International Patent Application No. PCT/US2021/063736 dated on Mar. 15, 2022, 12 pages.

Patel, D et al., 'Seismic volume visualization for horizon extraction', 2010, IEEE Pacific Visualization Symposium (PacificVis), pp. 73-80.

Patel, D et al., 'The seismic analyzer: Interpreting and illustrating 2d seismic data', 2008, IEEE transactions on visualization and computer graphics, vol. 14, No. 6, pp. 1571-1578.

Chen, C et al., 'Progressive transmission and rendering of foveated vol. data', 2006, Proceedings of the First International Conference on Computer Graphics Theory and Applications, pp. 67-75.

"vtkSmartVolumeMapper Class Reference", https://www.vtk.org/doc/nightly/html/classvtkSmartVolumeMapper.html, Retrieved on Nov. 1, 2024, 26 pages.

Chopra et al., "Understanding the seismic disorder attribute and its applications", http://www.chopraseismic.com/wp-content/uploads/2016/08/Chopra_Marfurt_TLE_Aug2016-LowRes.pdf, The Leading Edge, Aug. 2016, 08 pages.

"Petrel Subsurface software", Schlumberger, Retrieved from https://www.shcom/products-and-services/delivering-digital-at-scale/software/petrel-subsurface-software/petrel , Retrieved on Dec. 6, 2024, 15 pages.

"Petrel Geophysics", Schlumberger, Retrieved on Dec. 6, 2024, 02 pages.

"Why use Open Inventor Toolkit", Open Inventor Toolkit, Retrieved from https://www.openinventor.com/, Retrieved on Dec. 6, 2024, 05 pages.

"Seismic Data Visualization", Open Inventor Toolkit, Retrieved from https://www.openinventor.com/en/solutions/oil-gas-and-mining/seismic-data-visualization/, Retrieved on Dec. 6, 2024, 04 pages.

* cited by examiner

1010

1030

SEISMIC SURVEY DATA ACCESS

RELATED APPLICATION

This application is a National Stage Entry of International Application No. PCT/US2021/063736, filed Dec. 16, 2021, which claims priority to and the benefit of a U.S. Provisional Application having Ser. No. 63/132,945, filed Dec. 31, 2020, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include receiving a request for loading a seismic volume; determining a loading order for portions of the seismic volume, where the loading order prioritizes an interior portion of the seismic volume over a boundary portion of the seismic volume; and transmitting, via a network interface, at least one of the portions of the seismic volume according to the loading order. A system can include a processor; memory operatively coupled to the processor; a network interface; and processor-executable instructions stored in the memory to instruct the system to: receive a request for loading a seismic volume; determine a loading order for portions of the seismic volume, where the loading order prioritizes an interior portion of the seismic volume over a boundary portion of the seismic volume; and transmit, via the network interface, at least one of the portions of the seismic volume according to the loading order. One or more computer-readable storage media can include processor-executable instructions to instruct a computing system to: receive a request for loading a seismic volume; determine a loading order for portions of the seismic volume, where the loading order prioritizes an interior portion of the seismic volume over a boundary portion of the seismic volume; and transmit, via the network interface, at least one of the portions of the seismic volume according to the loading order. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
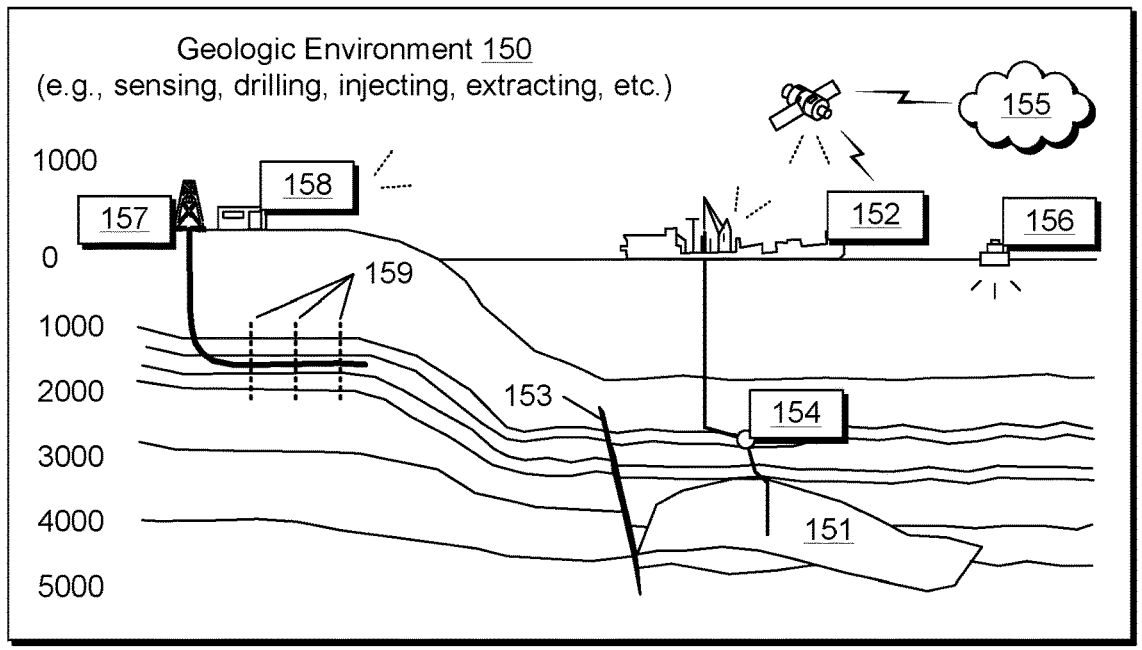
FIG. 1 illustrates an example of a geologic environment and an example of a technique.
Figure 1:
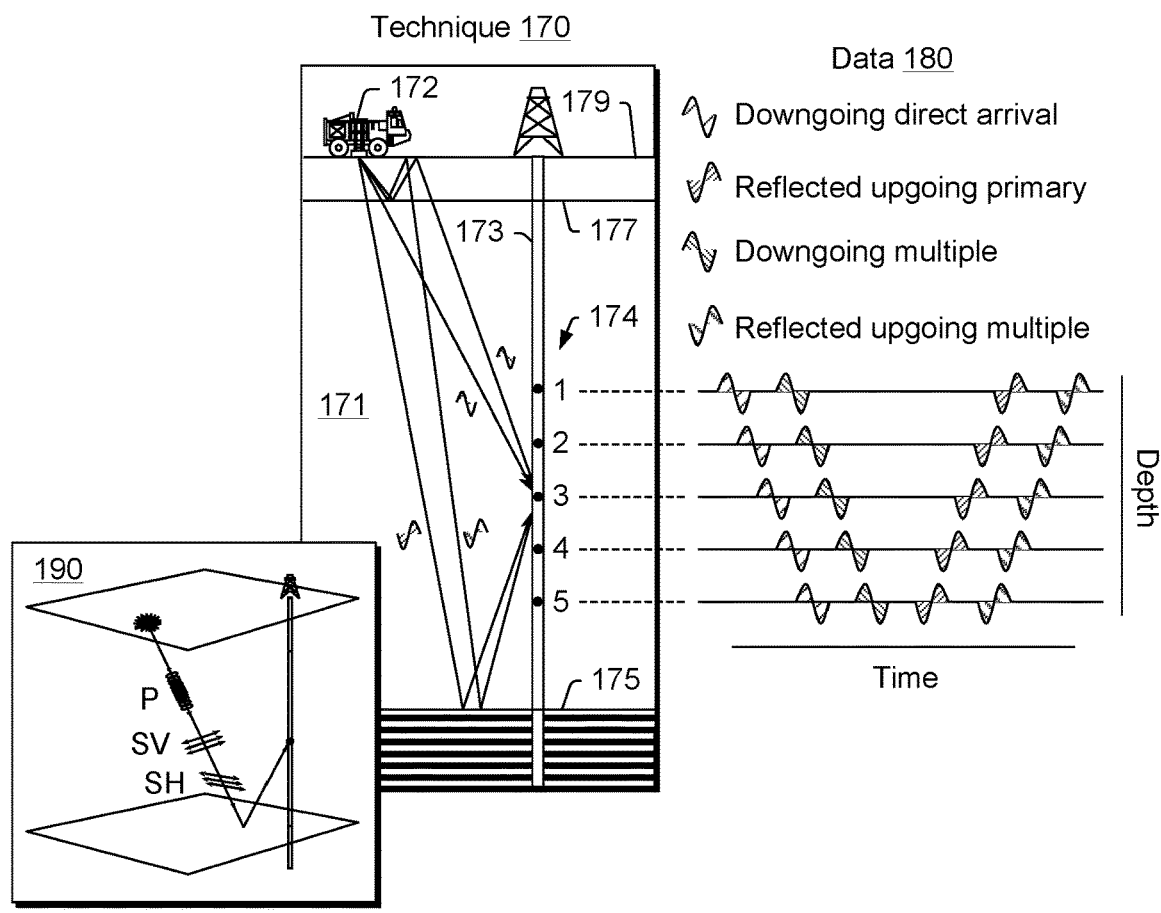

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. As such, seismic data includes information that can characterize a subsurface environment.

As an example, a seismic imaging system can be utilized to perform seismic surveys. For example, consider a land-based survey of a subsurface region where sensors can be positioned according to a survey footprint that may cover an area of square kilometers where one or more seismic energy sources are fired to emit energy that can travel through the subsurface region such that at least a portion of the emitted energy can be received at one or more of the sensors.

As an example, a land-based survey can include an array of sensors for performing a seismic survey where emission vehicles can emit seismic energy to be sensed by the array of sensors where data can be collected by a receiver vehicle as operatively coupled to the array of sensors. In such an example, sensors may be deployed by an individual as that individual walks along paths, which may be, for example, inline or crossline paths associated with a seismic survey. For example, the individual may carry a rod where hooks may allow for looping a cable and where the hooks may be slide off an end of the rod as the individual positions the individual sensors. Individual sensors may, depending on environment, include spikes that can be inserted into the ground (e.g., spikes may be of a length of the order of about 10 cm and be capable of conducting seismic energy to circuitry of the individual sensors). As an example, a sensor may be a UNIQ™ sensor (Schlumberger Limited, Houston, Texas) or another type of sensor. As an example, a sensor can include an accelerometer or accelerometers. As an example, a sensor may be a geophone. As an example, a sensor may include circuitry for 1 C acceleration measurement. As an example, a sensor may be self-testing and/or self-calibrating. As an example, a sensor can include memory, for example, to perform data buffering and optionally retransmission. As an example, a sensor can include short circuit isolation circuitry, open circuit protection circuitry and earth-leakage detection and/or isolation circuitry. In various instances, sensors may be subject to environmental conditions such as lightening where circuitry may help to protect sensors from damage.

As an example, a sensor may include location circuitry (e.g., GPS, etc.). As an example, a sensor can include temperature measurement circuitry. As an example, a sensor can include humidity measurement circuitry. As an example, a sensor can include circuitry for automated re-routing of data and/or power (e.g., as to supply, connection, etc.). As an example, an array of sensors may be networked where network topology may be controllable, for example, to account for one or more damaged and/or otherwise inoperative sensors, etc.

As mentioned, sensors may be cabled to form a sensor string. As an example, consider a string of about 10 sensors where a lead-in length is about 7 meters, a mid-section length is about 14 meters and a weight is about 15 kg. As another example, consider a string of about 5 sensors where a lead-in length is about 15 meters and a mid-section length is about 30 meters and a weight is about 12 kg. Such examples may be utilized to understand dimensions of an array of sensors and, for example, how far a sensor is from one or more neighbors, to which it may be operatively coupled (e.g., via one or more conductors, conductive materials, etc.).

As an example, data may be stored in association with one or more types of metadata, which may include metadata as to specifics of a sensor or sensors, an arrangement of sensors, operational status of a sensor or sensors, etc. As an example, such metadata may be utilized for one or more purposes, which may include determination of a loading order for loading of stored data (e.g., for rendering, etc.). For example, a region that may have been subjected to a lightning strike may be indicated via metadata and/or analysis of acquired data where data for such a region may be ordered with respect to other data for purposes of loading (e.g., assessing lightning effected data prior to loading other data, not loading lightning effected data, etc.).

As to a power insertion unit (PIU), such a unit can be utilized for power and/or data routing. For example, such a unit may provide power for a few sensors to tens of sensors to hundreds of sensors (e.g., consider a PIU that can power 500 or more sensors).

As an example, an installation can include a fiber-optic exchanger unit (FOX). For example, such a unit may be a router that can communicate with a PIU. As an example, fiber optic cables may be included in an installation. For example, consider FOX and PIU fiber optic couplings.

As an example, an installation may include over a thousand sensors. As an example, an installation may include tens of thousands of sensors. As an example, an installation may include over one hundred thousand sensors.

As explained, survey acquisition equipment, whether land-based and/or marine-based, can include various types of equipment that are operatively coupled. As an example, noise may originate in one or more manners as to such equipment (e.g., consider lightning strike noise, shark bite noise, wake noise, earthquake noise, etc.).

As to a marine survey, it may involve towing one or more streamers behind a vessel where a streamer includes sensors where one or more seismic energy sources are fired to emit energy that can travel through water and a subsurface region such that at least a portion of the emitted energy can be received at one or more of the sensors. Some types of marine surveys may include equipment that is to be placed on the ocean bottom. For example, consider ocean-bottom cables (OBCs) and ocean-bottom nodes (OBNs). As explained with respect to the land-based equipment, various types of equipment can be utilized to power, acquire, process seismic data. As an example, marine-based equipment may include at least some features of such equipment.

As an example, in marine-based equipment can include sensors where each of the sensors may include at least one geophone and a hydrophone. A geophone may be a sensor configured for seismic acquisition, whether onshore and/or offshore, that can detect velocity produced by seismic waves and that can transform motion into electrical impulses. A geophone may be configured to detect motion in a single direction. A geophone may be configured to detect motion in a vertical direction. Three mutually orthogonal geophones may be used in combination to collect so-called 3 C seismic data. A hydrophone may be a sensor configured for use in detecting seismic energy in the form of pressure changes under water during marine seismic acquisition. Hydrophones may be positioned along a string or strings to form a streamer or streamers that may be towed by a seismic vessel (or deployed in a bore).

A surface marine cable may be or include a buoyant assembly of electrical wires that connect sensors and that can relay seismic data to the recording seismic vessel. A multi-streamer vessel may tow more than one streamer cable to increase the amount of data acquired in one pass. A marine seismic vessel may be about 75 m long and travel about 5 knots per hour while towing arrays of air guns and streamers containing sensors, which may be located about a few meters below the surface of the water. A so-called tail buoy may assist crew in location an end of a streamer. An air gun may be activated periodically, such as about each 25 m (e.g., about at 10 second intervals) where the resulting sound wave travels into the Earth, which may be reflected back by one or more rock layers to sensors on a streamer, which may then be relayed as signals (e.g., data, information, etc.) to equipment on the tow vessel.

As to streamers, noise may occur due to vessel factors such as vessel speed, variation in speed, acceleration, waves impacting vessel performance, navigating around icebergs, making turns, etc. For example, where a vessel is to trace a path for a survey, the path can include turns that cause streamers to change in shape, which may cause bending, etc., changes in angles with respect to source originated seismic energy, etc. As vessel operations involves energy expenditure (e.g., liquid fuel, solar power, etc.), a survey may continue during turns of a survey path. As an example, a streamer may experience noise due to jetsam and/or flotsam, which may physically impact a streamer. As an example, a streamer may experience noise due to marine life such as, for example, noise due to a shark bite.

Streamer cables may be spooled onto drums for storage on a vessel, which subjects the streamer cables to various contact and bending forces, etc. (consider winding and unwinding operations).

Seismic data can be spatially two-dimensional or three-dimensional. Seismic data can be taken at different times, such as, for example, a pre-production time and a post-production time where differences can discern effects of production on a geologic region. In some examples, 3D seismic data can be 2D in space and 1D in time and 4D seismic data can be 3D in space and 1D in time; noting that in either instance, seismic signals are acquired with respect to time during a seismic survey (e.g., as may be sampled by seismic acquisition equipment to generate digital seismic data). Seismic data that are 2D spatially can be referred to as a slice (e.g., a 2D slice); while, seismic data that are 3D spatially can be referred to as a cube (e.g., volumetric seismic data).

As to seismic acquisition geometry of a seismic survey, a 2D grid can be considered to be dense where line spacing is less than about 400 m. As to 3D acquisition of seismic data, such an approach may be utilized to uncover (e.g., via interpretation) true structural dip (2D may give apparent dip), enhanced stratigraphic information, a map view of reservoir properties, enhanced areal mapping of fault patterns and connections and delineation of reservoir blocks, and enhanced lateral resolution (e.g., 2D may exhibit detrimental cross-line smearing or Fresnel zone issues).

A 3D seismic dataset can be referred to as a cube or volume of data; a 2D seismic data set can be referred to as a panel of data. To interpret 3D data, processing can be on the "interior" of the cube, which tends to be an intensive computation process because massive amounts of data are involved. For example, a 3D dataset can range in size from a few tens of megabytes to several gigabytes or more.

A 3D seismic data volume can include a vertical axis that is two-way traveltime (TWT) rather than depth and can include data values that are seismic amplitudes values. Such data may be defined at least in part with respect to a time axis where a trace may be a data vector of values with respect to time.

Acquired field data may be formatted according to one or more formats. For example, consider a well data format AAPG-B, log curve formats LAS or LIS-II, seismic trace data format SEGY, shotpoint locations data formats SEGP1 or UKOOA and wellsite data format WITS.

As to SEGY, which may be referred to as SEG-Y or SEG Y, it is a file format developed by the Society of Exploration Geophysicists (SEG) for storing geophysical data. It is an open standard, and is controlled by the SEG Technical Standards Committee, a non-profit organization. The format was originally developed in 1973 to store single-line seismic reflection digital data on magnetic tapes. The most recent revision of the SEG-Y format was published in 2017, named the rev 2.0 specification and includes certain legacies of the original format (referred as rev 0), such as an optional SEG-Y tape label, the main 3200 byte textual EBCDIC character encoded tape header and a 400 byte binary header.

The AAPG Computer Applications Committee has proposed the AAPG-B data exchange format for general purpose data transfers among computer systems, applications software, and companies. For log curves, the Schlumberger LIS (log information standard) has become a de facto standard, and extensions to it have been proposed. Another log data format called LAS, for log ASCII standard, has been proposed by the Canadian Well Logging Society. The UKOOA format is from the United Kingdom Offshore Operators Association. WITS is a format for transferring wellsite data (wellsite information transfer standard) as proposed by the International Association of Drilling Contractors (IADC).

A computational system may include or may provide access to a relational database management system (RDBMS). As an example, a query language such as SQL (Structured Query Language) may be utilized.

As an example, a machine can acquire seismic data and can process the seismic data via circuitry of the machine, which can include one or more processors and memory accessible to at least one processor. Such a machine can include one or more interfaces that can be operatively coupled to one or more pieces of equipment, whether by wire or wirelessly (e.g., via wireless communication circuitry). As an example, such a machine may be a seismic imager that can generate an image based at least in part on seismic data. Such an image can be a model according to one or more equations and may be an image of structure of a subterranean environment and/or an image of noise, which may be due to one or more phenomena. As an example, a seismic image can be in one or more types of domains. For example, consider a spatial and temporal domain where one dimension is spatial and another dimension is temporal. Such a domain may be utilized for seismic traces that are amplitude values with respect to time as acquired by a receiver of seismic survey equipment. As an example, time may be transformed to depth or other spatial dimension. In such an example, a seismic image can be in a spatial domain with two spatial dimensions.

An image can be a multidimensional construct that is at least in part seismic data-based. For example, a digital camera of a smartphone can process data acquired by a CCD array utilizing a model such that the model and associated values may be rendered to a display of the smartphone.

In a CCD image sensor, pixels are represented by p-doped metal-oxide-semiconductors (MOS) capacitors. These capacitors are biased above the threshold for inversion when image acquisition begins, allowing the conversion of incoming photons into electron charges at the semiconductor-oxide interface; the CCD image sensor is then used to read out these charges. Instructions executable by a processor of a smartphone can receive the charges as sensor data. Where a CCD is configured to be sensitive to color, it may utilize a Bayer mask over the CCD array where, for example, each square of four pixels has one filtered red, one blue, and two green such that luminance information is collected at every pixel, but the color resolution is lower than the luminance resolution. A color model that can include features of an RGB colorspace model can be utilized by the smartphone to generate data that can be then rendered to a display. Ultimately, the rendering to the display is a model with particular values that depend on the acquired CCD image sensor data.

In seismic imaging, rather than photons, seismic energy is sensed. Further, the amount of data sensed tends to be orders of magnitude greater than that of a digital camera of a smartphone. Yet further, a region "sensed" (e.g., surveyed) is generally not visible to the eye. Various types of models can be utilized for seismic imaging such that, for example, rendering can occur to a display of information that is based at least in part on sensed data.

Figure 2:
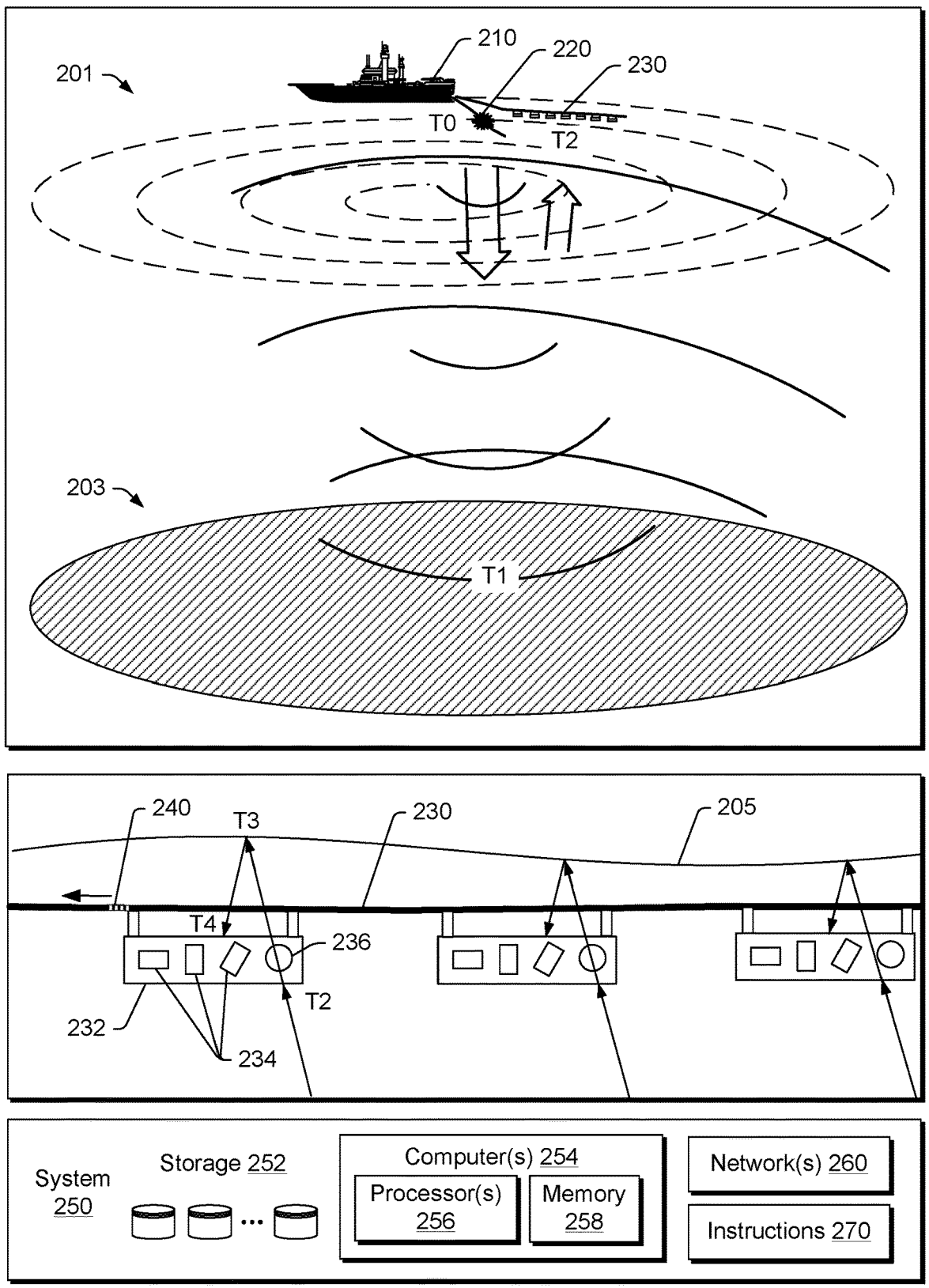
FIG. 2 illustrates an example of a geologic environment and examples of equipment.
Figure 3:
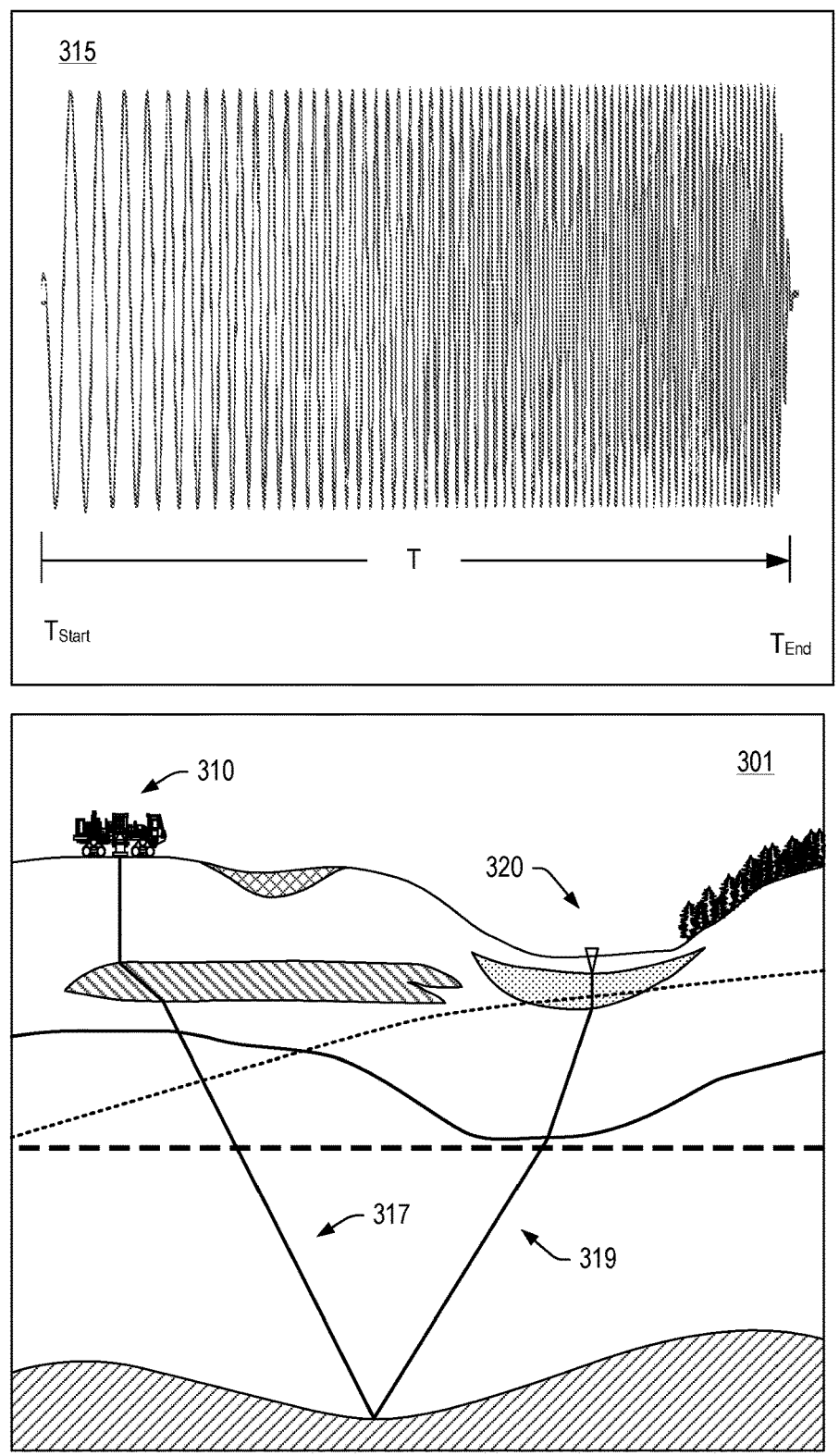
FIG. 3 illustrates an example of a geologic environment, examples of equipment and an example of a method.

FIGS. 1, 2 and 3, present various examples of equipment and techniques associated with seismic data.

FIG. 1 shows an example of a geologic environment 150 (e.g., an environment that includes a sedimentary basin, a reservoir 151, one or more fractures 153, etc.) and an example of an acquisition technique 170 to acquire seismic data. As an example, a system may process data acquired by the technique 170, for example, to allow for direct or indirect management of sensing, drilling, injecting, extracting, etc., with respect to the geologic environment 150. In turn, further information about the geologic environment 150 may become available as feedback (e.g., optionally as input to the system).

As an example, a system may include features of a simulation framework such as the PETREL seismic to simulation software framework (Schlumberger Limited, Houston, Texas). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, a system may include add-ons or plug-ins that operate according to specifications of a framework environment. For example, a framework environment marketed as the OCEAN framework environment (Schlumberger Limited, Houston, Texas) allows for integration of add-ons (or plug-ins) into a PETREL framework workflow. The OCEAN framework environment leverages .NET tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc., where fluid may be produced via the borehole (e.g., as a completed well, etc.). As an example, one or more workflows may be performed using one or more computational frameworks that include features for one or more of analysis, acquisition, model building, control, etc., for exploration, interpretation, drilling, fracturing, production, etc.

In the example of FIG. 1, the geologic environment 150 may include layers (e.g., stratification) that include a reservoir 151 and that may be intersected by a fault 153. As an example, a geologic environment may be or include an offshore geologic environment, a seabed geologic environment, an ocean bed geologic environment, etc.

As an example, the geologic environment 150 may be outfitted with one or more of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in a framework, computational environment, etc., that operates on seismic data, seismic attribute(s), etc. As an example, a workflow may be a process implementable in the DELFI environment, etc. As an example, a workflow may include one or more worksteps that access a module such as a plug-in (e.g., external executable code, etc.).

As an example, a seismic data can be utilized in building an earth model, which may include a mesh that can be utilized to discretize equations for a simulator. In such an example, one or more types of simulations may be performed as to physical phenomena such as, for example, fluid flow, phase behavior, stress, strain, acoustic energy, etc. As an example, a simulator such as the ECLIPSE simulator (Schlumberger Limited, Houston, Texas) or the INTERSECT simulator (Schlumberger Limited, Houston, Texas) may be utilized for simulation of fluid flow in a geologic environment. Simulations may be more accurate where an earth model is more accurate. For example, as simulation can be based on partial differential equations that account for physical phenomena, a more accurate representation of an actual physical environment can help to improve simulation accuracy and simulator performance (e.g., ability for a simulator to iteratively converge to a solution).

As an example, a feedback loop may exist between model building and simulation where inaccuracies in simulation results (e.g., a solution) can be identified in association with a region of a geologic environment and where that region may be re-interpreted. For example, consider a workflow that includes determining a loading order for seismic data for interpretation, which may include re-interpretation, that is based at least in part on simulation results (e.g., a region where physical phenomena may be of interest, where inaccuracies exist, etc.). In such an example, expediting loading of a particular region or regions may facilitate re-interpretation and revised model building and, hence, re-simulation based at least in part on the revised model.

In FIG. 1, the technique 170 may be implemented with respect to a geologic environment 171. As shown, an energy source (e.g., a transmitter) 172 may emit energy where the energy travels as waves that interact with the geologic environment 171. As an example, the geologic environment 171 may include a bore 173 where one or more sensors (e.g., receivers) 174 may be positioned in the bore 173. As an example, energy emitted by the energy source 172 may interact with a layer (e.g., a structure, an interface, etc.) 175 in the geologic environment 171 such that a portion of the energy is reflected, which may then be sensed by one or more of the sensors 174. Such energy may be reflected as an upgoing primary wave (e.g., or "primary"). As an example, a portion of emitted energy may be reflected by more than one structure in the geologic environment and referred to as a multiple reflected wave (e.g., or "multiple"). For example, the geologic environment 171 is shown as including a layer 177 that resides below a surface layer 179. Given such an environment and arrangement of the source 172 and the one or more sensors 174, energy may be sensed as being associated with particular types of waves.

As shown in FIG. 1, acquired data 180 can include data associated with downgoing direct arrival waves, reflected upgoing primary waves, downgoing multiple reflected waves and reflected upgoing multiple reflected waves. The acquired data 180 is also shown along a time axis and a depth axis. As indicated, in a manner dependent at least in part on characteristics of media in the geologic environment 171, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy), consider the Thomsen parameters $\epsilon$, $\delta$ and $\gamma$. The Thomsen parameter $\delta$ can describe offset effects (e.g., short offset). As to the Thomsen parameter $\epsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, seismic data may be acquired for a region in the form of traces. In the example of FIG. 1, the technique 170 may include the source 172 for emitting energy where portions of such energy (e.g., directly and/or reflected) may be received via the one or more sensors 174. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second). As an example, a seismic trace can be a vector with amplitude values where each entry in the vector represents a sample, for example, as sampled according to a sampling rate of a receiver. Such a vector can be amplitude with respect to time for a particular receiver, for a particular "shot" of a seismic source, etc.

FIG. 2 shows an example of a geologic environment 201 that includes a seabed 203 and a sea surface 205. As shown, equipment 210 such as a ship may tow an energy source 220 and a string of sensors 230 at a depth below the sea surface 205 (e.g., one or more streamers, etc.). In such an example, the energy source 220 may emit energy at a time T0, a portion of that energy may be reflected from the seabed 203 at a time T1 and a portion of that reflected energy may be received at the string of sensors 230 at a time T2.

As mentioned with respect to the technique 170 of FIG. 1, a wave may be a primary or a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (e.g., due to sub-seabed reflections, etc.).

As an example, each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 180 of FIG. 1 and data 240 of FIG. 2). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 205 (e.g., arrival times T2 and T4 may be relatively close). As an example, the sea surface 205 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, marine-based seismic data can include ghost noise due to interactions with the sea surface 205, as an air-water interface. As an example, seismic data may be analyzed for the presence and/or absence of ghost noise. As an example, where a deghosting technique is to be applied, a workflow may include determining a loading order for seismic data that is based at least in part on the presence of ghost noise. For example, consider an approach that provides for rapid assessment of ghost noise through loading and rendering of one or more regions where ghost noise may be present (e.g., at a maximum). In such an example, an operator may readily determine whether deghosting is to be applied and/or how it is to be applied to attenuate ghost noise (e.g., to improve interpretation, etc.).

As an example, each of the sensors 232 may include at least one geophone 234 and a hydrophone 236. In the example of FIG. 2, the at least one geophone 234 can provide for motion detection and the hydrophone 236 can provide for pressure detection. As an example, the data 240 (e.g., analog and/or digital) may be transmitted via equipment, for example, for processing, etc.

In the example of FIG. 2, the equipment 210 may include a system such as the system 250. As shown in FIG. 2, the system 250 includes one or more information storage devices 252, one or more computers 254, one or more network interfaces 260 and one or more sets of instructions 270. As to the one or more computers 254, each computer may include one or more processors (e.g., or processing cores) 256 and memory 258 for storing instructions (e.g., consider one or more of the one or more sets of instructions 270), for example, executable by at least one of the one or more processors. As an example, a computer may include one or more network interfaces (e.g., wired or wireless), one or more graphics cards, a display interface (e.g., wired or wireless), etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 250 may receive P and Z data via one or more of the one or more network interfaces 260 and process such data, for example, via execution of instructions stored in the memory 258 by the processor 256. As an example, the system 250 may store raw and/or processed data in one or more of the one or more information storage devices 252.

As an example, a method can include performing a seismic survey that acquires seismic data (e.g., traces, etc.) where such data can build an "image" of a survey area, for example, for purposes of identifying one or more subterranean geological formations. As an example, subsequent analysis of seismic data (e.g., interpretation, etc.) may reveal one or more possible locations of hydrocarbon deposits in one or more subterranean geological formations. As an example, an analysis can include determining one or more characteristics of one or more types of hydrocarbons. As an example, an analysis can include one or more of image generation and attribute generation (e.g., seismic attribute generation, etc.).

As an example, sources may be fired (e.g., actuated) according to a time schedule, a timing sequence, etc. As an example, consider a sequential source firing method that includes firing sources at intervals combined with continuous vessel travel. As another example, consider a simultaneous source firing method that include firing more than one shot at a given point in time (e.g., within a small duration of time such that analysis may consider the shots to be simultaneous). In such an example, sensors may sense information from multiple simultaneous shots and, for example, processing of the sensed information may separate the sensed information into individual source components. As an example, where simultaneous source firing is implemented, "boat time" (e.g., turnaround time, etc.) may be approximately the same or less than a sequential technique (e.g., depending on survey parameters, goals, etc.).

A method for source separation can include acquiring seismic data of a survey that utilizes multiple sources where the seismic data include blended seismic data for a number of emissions from a corresponding number of the multiple sources and associating at least two portions of the blended seismic data correspondingly with at least two of the multiple sources.

FIG. 3 shows a geologic environment 301 (lower left), equipment 310, a plot 315 of a frequency sweep as generated by the equipment 310 (e.g., with start and end times), downgoing energy 317 of the frequency sweep, upgoing energy 519 of the frequency sweep, and a sensor 320 (a node as in an array or grid). While FIG. 3 is shown as a land-based survey, various features, actions, etc., may be applied in a marine survey where, for example, seabed sensors are employed.

As an example, data can be data of a simultaneous vibroseis survey that includes seismic energy emissions S1, S2 and S3. Such data may be plotted as a correlated record from a simultaneous vibroseis acquisition where artifacts of an air blast from S1 (cross airwave), chimney noise from S3 and harmonic from S3 (cross harmonic) may be labeled along with a slip time and a record length for S2 (about 5 seconds). In a vibroseis survey, various types of noise may be present such as chimney noise, which may be seen when data are correlated with a survey sweep and visualized (as a column). As to other types of noise, these may include ground-roll and/or air-blast types of noise. In a slip-sweep operations data can be recorded as a mother record where the interval between two consecutive sweeps is referred to as the slip time (see S1 and S2 and slip time).

As to noise attenuation, an averaging approach may be utilized for some types of noise. For example, consider hardwired sensor arrays that attenuate noise by averaging. Such noise attenuation tends to be sensitive to sensor drop-outs and tends to be ineffective against burst noise. As to random noise, a method can include use of a prediction algorithm and/or a projection algorithm, which tend to assume an autoregressive model for the seismic signal and use prediction filter theory to attenuate the noise. Frequency-wavenumber domain velocity filtering and multiscale noise attenuation algorithms are examples of techniques that find use in coherent noise attenuation. In a seismic processing flow, as an example, one or more noise attenuation algorithms might be used to attack different noise types.

As mentioned, seismic data can be in a particular format such as, for example, a cube (e.g., a seismic volume). To understand the concept of a volume of data, consider a room that is divided up into points one foot apart such that each point has an (x, y, z) coordinate and a data value such as temperature at that point. An array that stores the temperature data values can provide temperature as a function of (x, y, z). For a 3D seismic data volume, rather than having a z-axis in strictly in distance, it may be in distance or in time, such as two-way traveltime (TWT), and, rather than temperature at a point, a point can be a seismic amplitude (e.g., an amplitude data value).

A 3D seismic data set can be a box full of numbers, where each number represents a measurement (e.g., amplitude) and where each number has an (x, y, z) position in the box. For a point in the interior of the box, three planes pass through it parallel to the top, front, and side of the box.

Where data values are amplitudes, they may be representing using a scale such as a grayscale, a color scale, etc. In a grayscale representation, dark and light bands in a 2D seismic slice of amplitude with respect to TWT and inline direction may relate to rock boundaries (e.g., reflectors in a subsurface formation).

Figure 4:
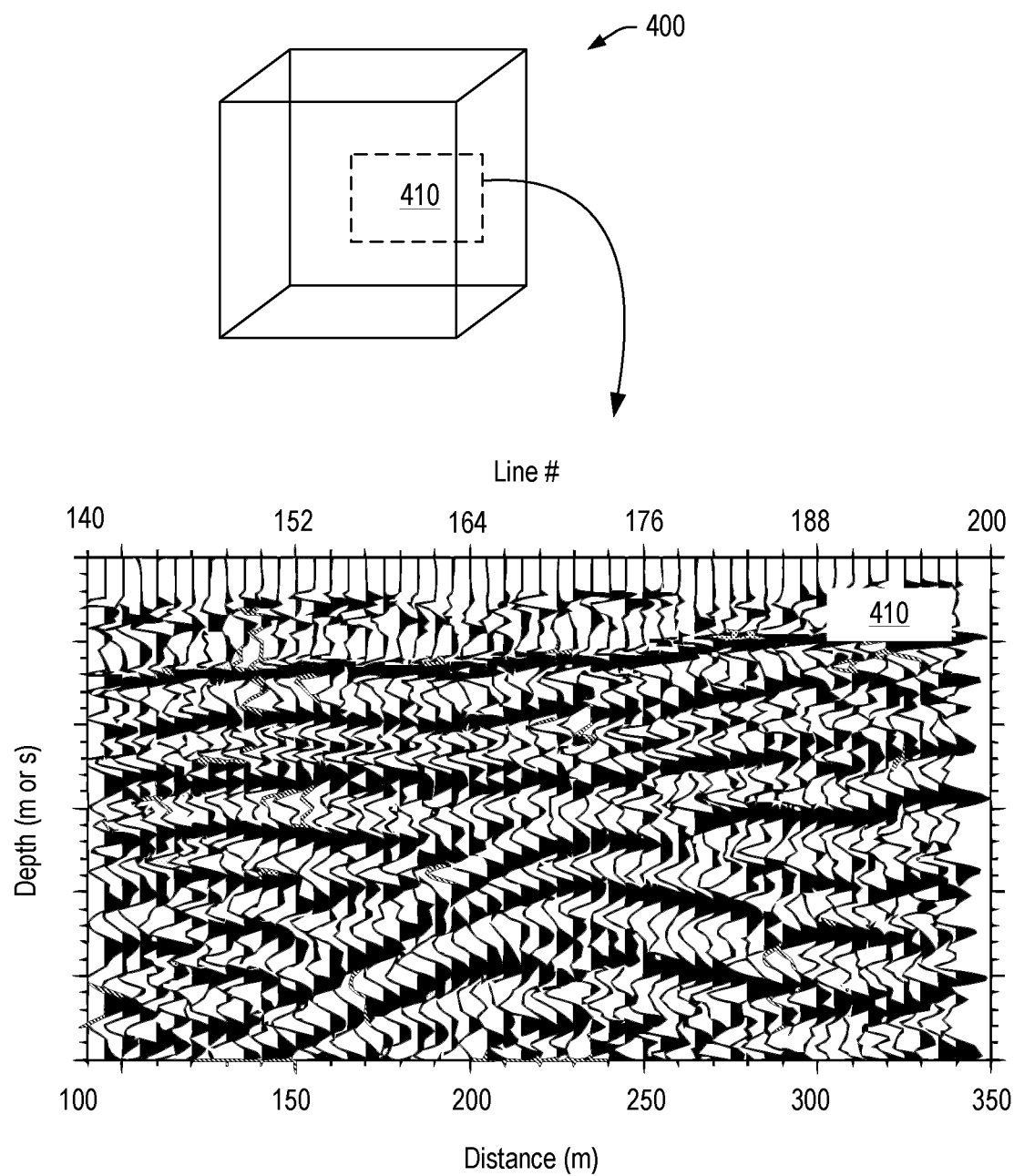
FIG. 4 illustrates an example of a seismic volume and an example of a slice.

FIG. 4 shows an example of a seismic volume 400 and a seismic slice 410 as accessed from the seismic volume 400 where the seismic slice 410 is presented as amplitude values with respect to depth (e.g., meters or seconds) and distance (e.g., meters) or line number (e.g., "Line #" of a crossline or inline coordinate). While the seismic slice 410 is shown to be orthogonal to the x, y, and z coordinate of the seismic volume 400, it may be at an angle that does not align with one or more of the coordinates. In such an example, interpolation or another technique may be utilized to generate a slice.

In various instances, seismic data are accessed in a manner that corresponds to coordinates of a seismic volume. For example, an instruction may include coordinates and/or dimensions along coordinate axes to facilitate access of seismic data from a seismic volume.

In the example of FIG. 4, the seismic slice 410 has the appearance of an image where seismic waveforms run vertically, which may be referred to as variable area/wiggle traces. Wiggle traces stems from pen and paper recorders, such as those of a seismograph. As an example, rather than represent seismic waveforms, as mentioned, a scale may be utilized. For example, a scale can be utilized to represent amplitudes. As an example, a blue, white and red color scale may be utilized where gradational blue is utilized for amplitude peaks (e.g., positive values) and gradational red is used for amplitude troughs (e.g., negative values). As an example, a variable intensity scale may be utilized that can provide for presentation of a balanced appearance of positive and negative amplitudes, presentation of data without overlap (e.g., overlapping wiggle traces), presentation of higher amplitude (e.g., more negative or more positive) without mislocation, etc. As an example, a multi-gradational color scheme may help to enhance amplitude events and be particularly applicable to identification of hydrocarbon effects, identification of reservoir reflectors, etc. As an example, a single-gradational color scheme may, on the other hand, enhance low amplitude events and be particularly useful for identification of faults. As mentioned, a variable intensity grayscale scheme may be utilized.

As an example, an enhanced dynamic range color scheme may be utilized, which may facilitate making various types of stratigraphic identifications. For example, consider a cyan-blue-white-red-yellow scheme. Such a scheme may help in identification of gas-oil contact (e.g., a gas bright spot may be higher in amplitude than an oil bright spot).

An interpreter may aim to look for amplitude trends and patterns, low amplitude indications and high amplitude indications. An interpreter may look for character and lateral changes. As mentioned, a color approach may facilitate pairing, identification of problems with data phase and polarity, etc.

While various aspects as may be seen in vertical seismic slices have been mentioned, a scheme may be suitable for facilitating interpretation of a horizontal seismic slice (e.g., at a constant TWT, a constant depth, etc.). As an example, a gradational color scheme may facilitate interpretation of features in a horizontal seismic slice (e.g., trends, patterns, etc.).

Figure 5:
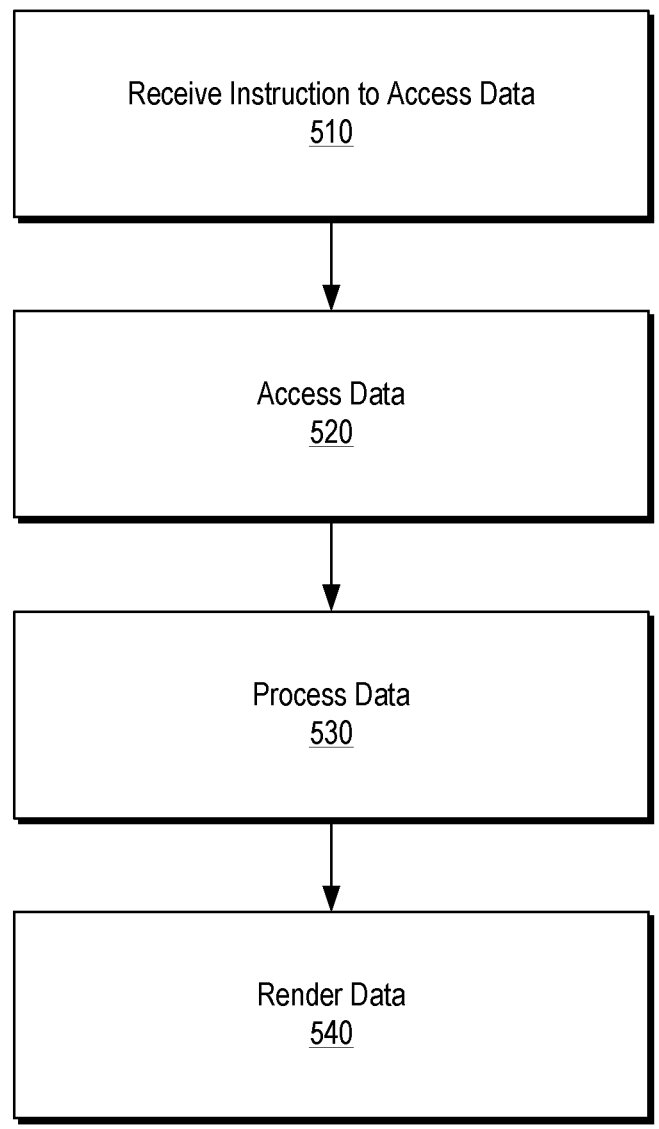
FIG. 5 illustrates an example of a method.

FIG. 5 shows an example of a method 500 that includes a reception block 510 for receiving an instruction to access data, an access block 520 for accessing data, a process block 530 for processing accessed data and a render block 540 for rendering processed, accessed data. Such a method can include one or more communication blocks, for example, consider a transmission block for transmitting accessed data and/or processed data.

As explained, seismic volume analysis can provide for detection of various features such as, for example, horizons, faults, salts, geobodies, etc., that are of interest in subsurface exploration in the oil and gas industry.

As explained, seismic volume visualization can be utilized to uncover layered information inside a geologic region, as much of the upper regions of the Earth exist in layers (e.g., sedimentary layers).

Various types of seismic volume workflows demand access to seismic volume data structures to provide for visualization. As mentioned, the size of a seismic volume can be substantial and demand considerable resources and/or time for access, processing, transmission, rendering, etc. Thus, size can be an impediment to a workflow. For example, where a user aims to interpret a geologic region, the user may find that data-related processes slow down interactivity, which may cause the user to operate in a manner that is based on such processes as rate determining. In such an approach, the user may lose focus, concentration, etc., as more opportunities arise for interruptions, distractions, etc. For example, consider a user calling for a seismic slice where the user visually identifies a feature that is believed to extend into at least an adjacent seismic slice. In such a situation, the user may have to wait a considerable amount of time for a call and response, and rendering, to occur for the one or more adjacent seismic slices. Waiting can therefore be a nuisance, which may wear on an interpreter and decrease the interpreter's productivity and enjoyment.

As mentioned, a seismic volume can be greater than several gigabytes and may be more than one hundred gigabytes (e.g., or even a terabyte or more). Loading such large seismic volumes, and analyzing them, can be considered a high-performance computing (HPC) task. As mentioned, loading of a seismic volume or seismic volumes can affect user experience where there is beyond a reasonable delay for loading.

As an example, a method can improve user experience through intelligent loading, which may be, for example, heuristically informed loading. For example, consider heuristic driven loading of one or more seismic cubes (e.g., one or more seismic volumes). As explained, one or more types of approaches may be utilized for intelligent loading that can include determining a loading order (e.g., loading priority, etc.). As mentioned, one or more factors such as, for example, one or more of user interest, acquisition equipment characteristics, noise, metadata, subsurface features, etc., may be considered in a loading workflow.

Figure 6:
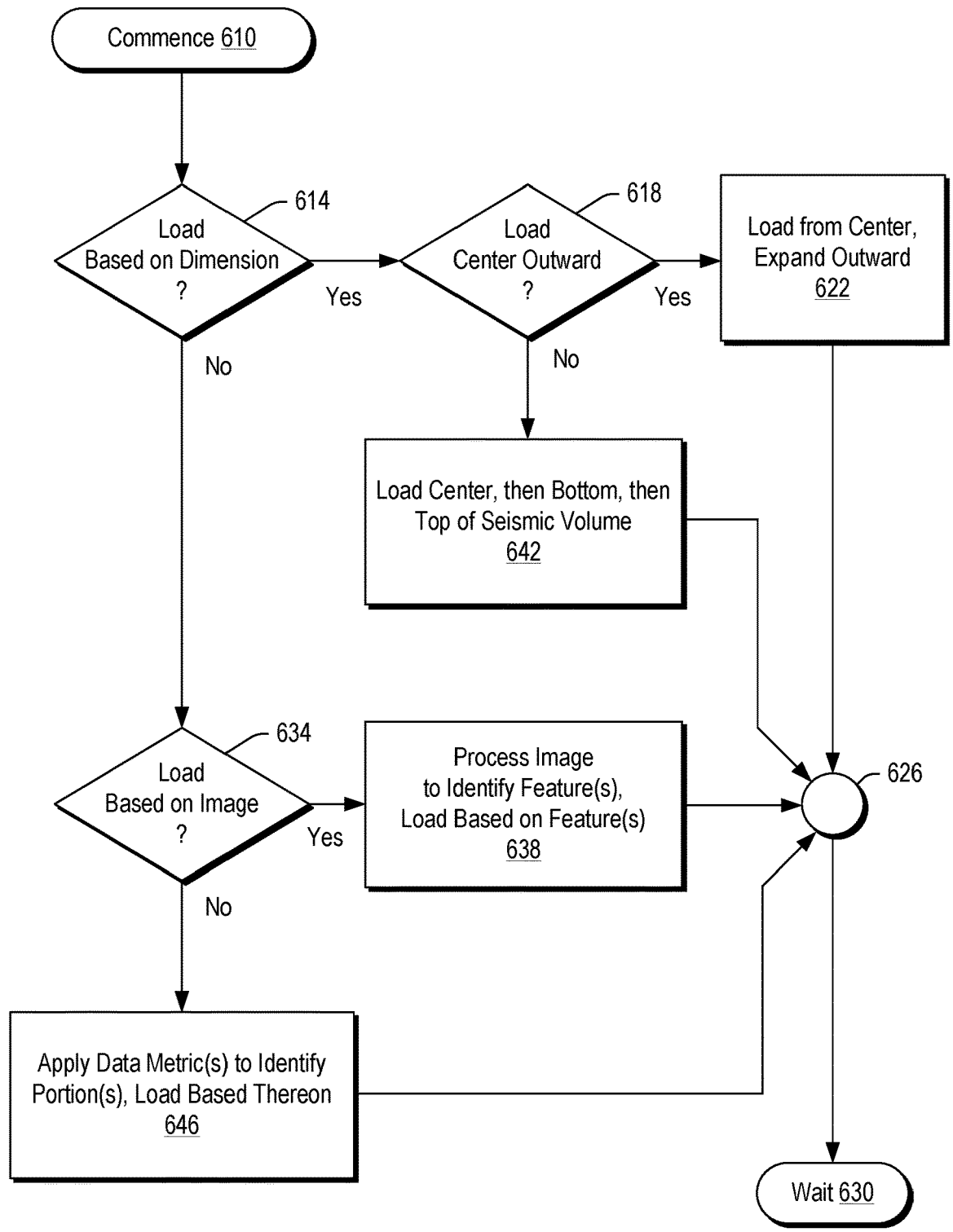
FIG. 6 illustrates an example of a method.

FIG. 6 shows an example of a method 600 that can automatically make various decisions, which can be tiered, for purposes of determining how to perform loading.

As shown in the example of FIG. 6, the method 600 includes a commencement block 610 for commencing loading and a decision block 614 for deciding whether loading is to occur based on a dimension or dimensions. Where the decision block 614 decides that loading is to occur in a dimension-based manner, the method 600 continues to a decision block 618 for deciding whether loading is to occur from a center outward or not. As shown, where the decision block 618 decides that loading is to occur from a center outward, the method 600 continues to a load block 622 for loading seismic data from a seismic volume from the center in a manner that expands with respect to time outward.

As shown, the method 600 may flow to a junction 626, which may be a loop that is interactive between a database and computing device (e.g., via a network or other connection) that provides for execution of a decided upon scheme, for example, until an instruction may be received to halt, terminate, adjust, etc. As an example, where appropriate, the method 600 can proceed to a wait block 630, which may be reached after performing a loading scheme and/or after one or more actions associated with the junction 626.

Referring again to the decision block 614, as shown, where the decision block 614 does not decide that loading is to be dimension-based, the method 600 can continue to a decision block 634 for deciding whether to loading is to occur based on an image or images (e.g., image-based loading). As shown, where the decision block 634 decides that loading is to occur in an image-based manner, the method 600 continues to a process block 638 for processing one or more images to identify one or more features and for performing loading based on at least one of the one or more identified features. As shown, the method 600 may then continue, as appropriate to the junction block 626 and, as appropriate, to the wait block 630.

Referring again to the decision block 618, as shown, where the decision block 618 does not decide that loading is to be dimension-based, the method 600 can continue to a load block 642 for loading in an order of center, then bottom, then top of a seismic volume. For example, the load block 642 can be utilized for a pre-determined order of loading that may be readily defined given a volume defined by x, y and z coordinates (e.g., an x, y and z array, etc.). In the example give, center may be a region of interest ranked higher than bottom, which can be ranked higher than top. Such an approach can provide for loading bottom prior to top as bottom is generally defined as being deeper and of greater interest than a layer or layers near the Earth's surface (e.g., land surface, ocean bottom surface, etc.). As shown, the method 600 may then continue, as appropriate to the junction block 626 and, as appropriate, to the wait block 630.

Referring again to the decision block 634, as shown, where the decision block 634 does not decide that loading is to be image-based, the method 600 can continue to a load block 646 for applying one or more data metrics to identify one or more portions (e.g., ranking one or more portions) and loading based therein. Such an approach can be referred to as a data metric-based identification approach where a data metric may be applied to data of a seismic volume (e.g., raw data, attribute data, etc.). For example, a data metric may be a wave-based metric that can be applied to a trace as seismic data stored with respect to depth, whether as a distance or a time (e.g., TWT, which can be a proxy for depth). As to the load block 646, it may use a disorder metric or another type of data metric to identify portions deemed to be of greater interest for loading. As shown, the method 600 may then continue, as appropriate to the junction block 626 and, as appropriate, to the wait block 630.

As an example, a graphical user interface (GUI) may provide one or more graphic controls for selection, definition, etc., of a metric or metrics. In such an example, the GUI may be part of a computational framework, which may provide for use of one or more tools such as statistical analysis tools that can be utilized to generate a metric. For example, a user may select a region of a seismic volume and define a metric using the seismic data in the seismic volume. For example, consider a trace as a wiggle where the user defines the metric to characterize the wiggle such that the metric can be applied to the seismic volume to identify one or more portions thereof for loading. Where multiple portions are identified, which may be contiguous in space (e.g., connected) or not (e.g., not connected), a load block may include ranking (e.g., prioritizing) the individual portions of the multiple portions where loading occurs according to the ranking (e.g., most matching first, etc.). While the foregoing example of a metric is referred to for matching, a metric may be utilized for identifying one or more non-matching portions, which may be of interest. As an example, a method may utilized a combination of metrics, which can include a metric that aims to include and a metric that aims to exclude such that one or more particular portions can be identified for loading in a metric-based manner.

As an example, a loading process may be fluid such that rendering occurs in real-time as seismic data are loaded. In such an example, a rendering can appear to be dynamic, for example, expanding like an animation. In such an example, a computational framework may include one or more controls for controlling rendering. For example, where a user desires to slow down the animation-like experience, the user may instruct the computational framework to proceed at a particular rate. In such an example, the computational framework may automatically determine a maximum rate based on an actual loading rate and/or estimated loading rate, and provide a graphic control that allows a user to adjust to a lesser rate. For example, where loading proceeds with an actual rate of X slices per minute, a control graphic may be rendered with that actual rate, for example, at an end of a slider control graphic where a user may utilized a finger, a mouse, a voice command, etc., to reduce the rate via the control graphic. In such an example, where a user sees a region of particular interest being animated, the user may slow down the animation. In such an example, once the region of particular interest has been rendered (e.g., end of a feature, etc.), the user may instruct the computing framework to resume at a faster rate.

As an example, where a user decreases a rate of rendering (e.g., an animation rate) of a computational framework, loading may continue at a faster rate such that local memory is filled and ready for rendering. In such an example, the user may instruct the computational framework to render at a rate that is faster where, for example, the computational framework can determine how fast that rate may be and, for example, when the rate may be reduced to one that matches an actual loading rate. For example, at some point, after the faster rate depletes the data in local memory, the faster rate will no longer be achievable as a maximum rate. A computational framework may determine how long it will take to deplete the local memory given input at a loading rate and output for rendering at an elevated rate. In such an approach, where a user desires slowing down a rate for a period of time, the user may still, ultimately, be able to take advantage of the implemented loading scheme for a region.

As an example, loading via a load block can be sliced-based loading. For example, whether a center outward approach, a defined approach, an image-based approach, or a metric-based approach is utilized (e.g., or a combination thereof), loading can be slice based where loading acts to load 2D slices, which as mentioned, can correspond to lines such as inline and crossline numbers of a seismic survey. As an example, a seismic survey may include a footprint that can be referred to as an acquisition footprint that may be defined by an array of seismic sensors, one or more streamers as towed by a vessel, etc. As an example, an acquisition footprint may be viewable (e.g., renderable) as an areal extent that may be defined using coordinates such as latitude and longitude, north, south, east, west, etc. As an example, a seismic volume, as a data structure, can include header or other related information that can be utilized to provide information, for example, as to one or more acquisition parameters, which can include, for example, one or more acquisition footprint parameters.

As an example, loading may occur via utilization of one or more kernels that define a loading unit or loading units. For example, a kernel may be of a particular dimension or dimensions, optionally along with one or more algorithms that may operate on data. In such an example, one or more decisions may be made on a kernel by kernel basis as to whether or not to load particular data of a seismic cube. As an example, a kernel may provide for noise analysis, structure analysis, etc. As an example, a kernel may be utilized within a larger scheme. For example, consider determining a region for loading and applying a kernel within the region where decisions as to data within the region may be determined on a kernel by kernel basis. In such an example, loading may be expedited within a particular region (e.g., as may be ordered with respect to one or more other regions) based on one or more criteria.

The example method 600 of FIG. 6 includes various paths, one or more of which may be utilized as a separate method. As an example, a computational framework can include a configuration file, a configuration GUI, etc., where a user may select and/or where the computational framework may select an appropriate configuration for a given seismic volume or seismic volumes.

As an example, a method can provide one or more different ways to load interesting parts of a seismic volume, which can depend on one or more factors (e.g., region of the Earth, depth in Earth, seismic survey type, data size, bit-depth of data, network bandwidth, metric(s), image type, rendering type, end device type, noise, acquisition equipment, etc.). As mentioned, a seismic volume may include metadata, which may be available for determining whether to load particular data and/or how to load particular data.

As mentioned, a seismic volume can be stored according to a format such as, for example, the SEG-Y format. In the SEG-Y format, trace Data sample values may be complement integers or floating-point. As an example, consider data sample formats of 8-bit integer or 32-bit IEEE floating-point (e.g., big-endian byte order with the sign/exponent byte written closest to the beginning of the file).

As an example, a computational framework may utilize source and/or trace locations, which can be part of a method for processing seismic data, and knowing the location of the processed data with respect to other data. As an example, seismic coordinates may be supplied as geographic coordinates and/or grid coordinates. As an example, a coordinate reference system (CRS) definition may be utilized, which may be, in the SEG-Y format, in the Binary Header, the Extended Textual Headers and the Trace Headers.

A trace header can include various types of information. For example, consider the following from the SEG-Y format as to trace identification codes: −1=Other; 0=Unknown; 1=Seismic data; 2=Dead; 3=Dummy; 4=Time break; 5=Uphole; 6=Sweep; 7=Timing; 8=Waterbreak; 9=Near-field gun signature; 10=Far-field gun signature; 11=Seismic pressure sensor; 12=Multicomponent seismic sensor—Vertical component; 13=Multicomponent seismic sensor—Cross-line component; 14=Multicomponent seismic sensor—In-line component; 15=Rotated multicomponent seismic sensor—Vertical component; 16=Rotated multicomponent seismic sensor—Transverse component; 17=Rotated multicomponent seismic sensor—Radial component; 18=Vibrator reaction mass; 19=Vibrator baseplate; 20=Vibrator estimated ground force; 21=Vibrator reference; 22=Time-velocity pairs; and 23 to N=optional use, (maximum N=32,767). As another example, consider trace value measurement units: −1=Other; 0=Unknown; 1=Pascal (Pa); 2=Volts (v); 3=Millivolts (mV); 4=Amperes (A); 5=Meters (m); 6=Meters per second (m/s); 7=Meters per second squared (m/s$^2$); 8=Newton (N); and 9=Watt (W).

As an example, a computational framework may perform loading and/or processing based on one or more parameter values that may be in a request and/or in a seismic volume (e.g., header, etc.). As mentioned, various types of rendering styles can be utilized such as trace wiggles, color scale, grayscale, etc. Where units are indicated, the seismic data may be of a particular type (e.g., marine, land, etc.) where a particular type of rendering style is available, more suitable, etc. As an example, a method may include accessing header information and loading and/or processing seismic data based at least in part on trace value measurement units.

In the SEG-Y format, Trace Data follows each Trace Header. The seismic data in a SEG-Y formatted file can be organized into ensembles of traces or as a series of stacked traces. When the trace data are organized into ensembles of traces, the ensemble type may be identified (e.g., Binary File Header bytes 3229-3230). As to some examples of a trace sorting code (e.g., type of ensemble), consider: −1=Other; 0=Unknown; 1=As recorded (no sorting); 2=CDP ensemble; 3=Single fold continuous profile; 4=Horizontally stacked; 5=Common source point; 6=Common receiver point; 7=Common offset point; 8=Common mid-point; and 9=Common conversion point.

Figure 7:
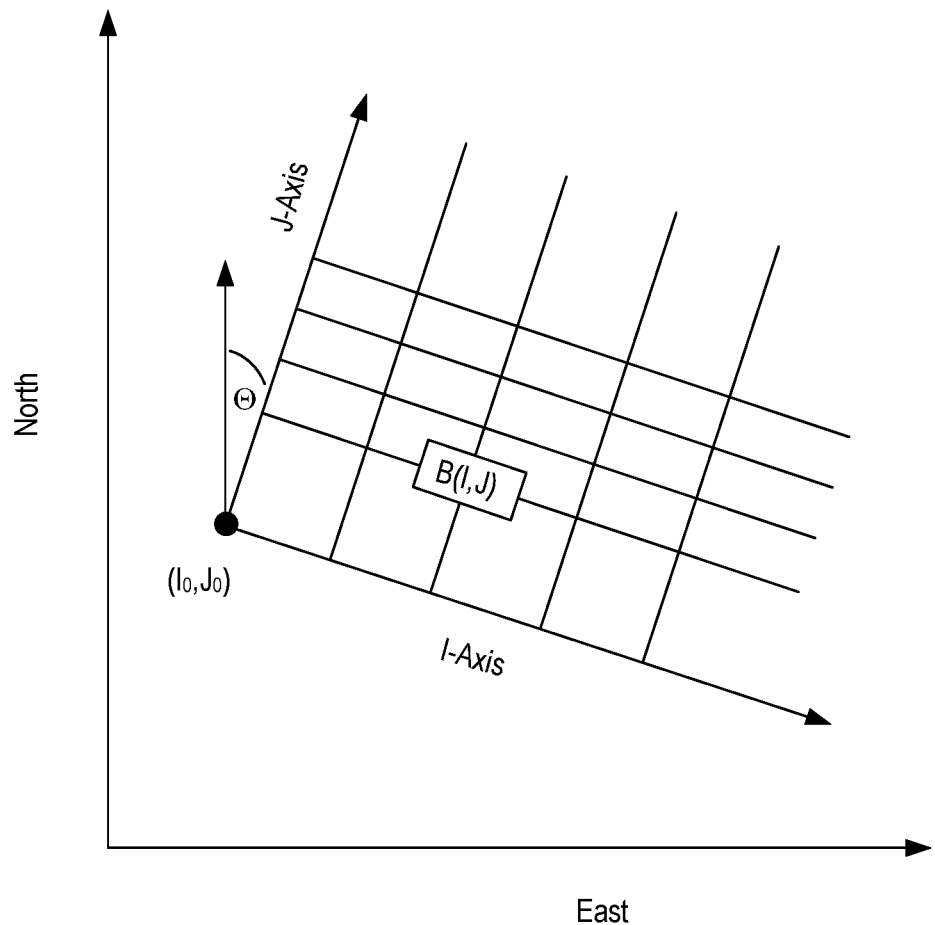
FIG. 7 illustrates an example of a convention for a grid.

FIG. 7 shows an example of a bin grid representation 700 that can be utilized for organizing, storing, loading, processing, etc., of seismic data. In the SEG-Y format, the Bin Grid Definition stanza defines a bin grid including its relationship to a projected CRS (e.g., map grid). The projected CRS can be defined in a Location Data stanza. The content of the Bin Grid Definition stanza follows the provisions of the UKOOA P6/98 v3.0 format. The bin grid is the relative coordinate framework which defines a matrix of evenly spaced points referred to as the bin nodes. The term bin node is used instead of the term bin center and refers to the locations where the bin grid lines intersect. The bin grid is defined by a pair of orthogonal axes designated the I and the J axes, with the I axis rotated 90 degrees clockwise from the J axis. The order of specifying bin grid coordinates can be the I value followed by the J value (I, J) (see, e.g., B(I, J)). The choice of I, J axes is made to alleviate confusion between bin grid (I, J) and map grid (E, N) coordinates. Axes may be labeled by as appropriate, for example, consider such terms as Inline and Crossline, Row and Column, x and y, Line and Trace. For the purpose of data exchange through the SEG-Y format reference is to the I and J axes. Coordinates of three check nodes can be utilized to permit numerical verification of the bin grid definition parameters. For example, two of these points can be taken on the J axis and a third point remote from the J axis within the area of coverage.

As an example, a user that desires loading and rendering of seismic data of a seismic volume may desire a view that utilizes a particular coordinate system, which may include one or more of I, J and K (e.g., a vertical axis) and/or one or more of N, E, W, and S. As an example, a method can include loading where a conversion may be made where a request may differ from a storage convention. For example, consider a request for loading where rendering is to be in a N-E coordinate system where high performance computing (HPC) equipment may transform seismic volume data to expedite rendering, which may be, for example, on a computing device with lesser capabilities (e.g., a mobile device, etc.).

As an example, a method can include discovery of various factors, for example, analyzing a request received via a network (e.g., a URL, an API call, etc.) to determine network parameters, end device type (e.g., OS, processor, GPU, etc.), etc. As to network parameters, consider a ping, which may be analyzed, for example, according to delay: <30 ms (e.g., low delay); 30 ms to 50 ms (e.g., acceptable); 50 ms to 100 ms (e.g., slow); 100 ms to 500 ms (e.g., very slow); and >500 ms (e.g., problematic).

A ping can be a signal that requests a response that can check availability and measure how long the response takes. A ping request can be performed using a ping command, which is a standard command in most command line interfaces. Several network utilities provide a ping feature, which allows for issuance of a ping by entering an IP address, a domain name, etc. Multiple pings may be transmitted and provide an average of the pings at the end. To perform a ping command from a command line interface, consider entering "ping" followed by an IP address or domain name to ping (e.g., ping 123.123.123.123). A ping itself can be a single packet (e.g., 32 bytes, 56 bytes, etc.) that can include an "echo" request. The end destination equipment, if available, can respond with a single packet as a reply. The ping time, generally measured in milliseconds, is the round trip time for the packet to reach the requested destination and for the response to return to the transmitter.

As another example, a trace command may be utilized, for example, consider traceroute or tracert, which are network diagnostic commands for displaying a route (path) and measuring transit delays of packets across an Internet Protocol (IP) network. The history of the route is recorded as the round-trip times of the packets received from each successive host (remote node) in the route (path); the sum of the mean times in each hop is a measure of the total time spent to establish the connection. In comparison, ping computes the final round-trip times from the destination point.

As an example, a method can include geolocation as to a requesting computing device. As an example, a geolocating service can be utilized, which may return information such as, for example:
ip: "YY.XXX.YYY.XX"
type: "ipv4"
continent_code: "NA"
continent_name: "North America"
country_code: "US"
country_name: "United States"
region_code: "TX"
region_name: "Texas"
city: "Houston"
latitude: 29.749907
longitude: −95.358421
location: Object { }
time_zone: Object{ }
currency: Object{ }
connection: Object{ }
security: Object{ }

As explained, seismic data can be stored according to one or more standards (e.g., SEG-Y, ZGY, BOLT, etc.). Such formats do not include information as to how loading is to be performed. As an example, a format may be modified and/or augmented, for example, such that metadata, etc., which may be related to or include coordinates for a loading order as to various portions of a seismic volume. As an example, a service may be implemented using a computational framework, which may be via an API call, etc., where a seismic volume is augmented to include a loading order where the loading order may be stored in a seismic volume file (e.g., in a portion of a header, etc.) for one or more loads of seismic data of the seismic volume. For example, once a seismic volume has been processed once to determine a loading order, the loading order may be saved as part of the seismic volume (e.g., in a header, etc.) such that the loading order can be automatically used in a subsequent request for the seismic volume. Such an approach may expedite a workflow of a particular individual (e.g., expecting reproduction of a prior intelligent loading order, etc.). As mentioned, a user may control rendering rate such as to provide an animation effect. Where the user desires the same animation effect, such an animation effect may be achieved using a stored loading order. As mentioned, as interpretation can be a human vision based process, a common, repeated user experience can provide for benefits (e.g., user workflow expectation, quality control, communication with colleagues through demonstration, presentation, etc.).

As explained, a seismic volume can include location information and a request can include location information. In such an example, one or more types of location information may be utilized for one or more purposes as to loading, processing, rendering, etc. As an example, a location of a request may be associated with a particular set of parameters. For example, consider a facility that includes interpreters as to horizons where a common scheme may be utilized for rendering. In such an example, where a computational framework determines a location of a request being associated with that facility, it may load, process, etc., seismic data in a pre-determined manner for that facility. Such an approach can expedite workflows performed by interpreters at the facility and can help to harmonize workflows, interpretation techniques, interpretation results among interpreters (e.g., for more consistency, quality control, etc.).

As an example, in a field application, consider a user being present in a vehicle, which may include GPS and/or other location circuitry. In such an example, the vehicle may be driven to a particular location or locations (e.g., land and/or marine) where coordinates may be utilized for purposes of loading. For example, consider an example where a vehicle is at location where a depth or depth range may be specified or otherwise determined to be a center of a region to load. In such an example, the longer the vehicle stays at the location, the more data expanding outwardly from the center may be loaded. Where a user determines that the data may not be of interest or that it has been sufficiently reviewed, the vehicle may be driven to another location, for example, to determine a new center of a new region for loading. As an example, a vehicle may navigate a route where the route defines a region that can be utilized for purpose of loading. For example, consider driving a vehicle in a circle about a center where the circle defines the region (e.g., consider navigating a boat or ship in a circle, etc.). While a circle is mentioned, one or more types of shapes may be defined via navigation of a vehicle or, for example, via walking where location circuitry is available to capture coordinates for purposes of loading.

As mentioned, various factors can be utilized for loading. For example, where a computational framework decides to load a seismic volume using a dimension-based approach, then the center of the seismic volume may be loaded first followed by an outward expansion from the center in one or more directions. As mentioned, the less interesting portions of a seismic volume can be at the top (e.g., closer to the Earth's surface). In such example, after loading a center region, a method can load sides and bottom before loading the top.

As explained, where an image-based approach is utilized for loading, a method can include deriving an image-based metric using image processing, for example, on first slice to control loading of one or more subsequent slices. As an example, where a data metric approach is utilized, such as, for example, a disorder metric or other similar metric, such a data metric can be determined using a first slice to control loading of one or more subsequent slices.

As explained, intelligent loading (e.g., slice loading, etc.) of seismic data from a seismic volume can expedite one or more workflows, which may increase in benefits as size of the seismic volume increases. As explained, user experience can be enhanced, along with experience of teams, etc. As explained, a method can provide intelligent loading, for example, by prioritizing loading of more interesting portions of a seismic volume, to improve user experience.

Referring again to the method 600 of FIG. 6, as explained, dimension, image or data metric-based approaches may be employed. In such examples, a dimension-based approach may utilize a dimension metric, an image-based approach may utilize an image metric and a data metric-based approach may utilize a data metric.

As an example, a method can include using one or more metrics for identifying more interesting portions of a seismic volume. In such an example, those portions may be ranked for purposes of loading (e.g., a loading order).

As an example, a method can include automatically deriving a metric, for example, using a portion of a seismic volume that is first selected by a user (e.g., consider selection using a kernel, etc.). For example, consider a method that includes receiving a request for a slice of a seismic volume where the slice (e.g., a slice kernel, etc.) is analyzed by a computational framework to derive a suitable metric or metric that can be utilized to prioritize how additional slices (e.g., or portions of slices) are to be loaded. As mentioned, such a computational framework may include or be operatively coupled to HPC resources where computations can be performed more expeditiously than on a computing device that issues a request. In such an example, the computing device that issues the request can operate without additional burden while receiving the benefits of the HPC resources (e.g., an asymmetry in computing resources).

As an example, a seismic survey may be planned such that an acquisition footprint (e.g., crossline and inline directions) covers a region of interest. In such an example, the region of interest (e.g., a reservoir, a fault, a geobody, a salt formation, etc.) may be somewhat centered. For example, the acquisition footprint can include boundaries such that the region of interest is included within the boundaries. As such, the region of interest may be within a seismic volume and may be substantially centered in the seismic volume. Where an indication exists that a region of interest is somewhat centered in a seismic volume, a center first approach may be utilized for loading.

Figure 8:
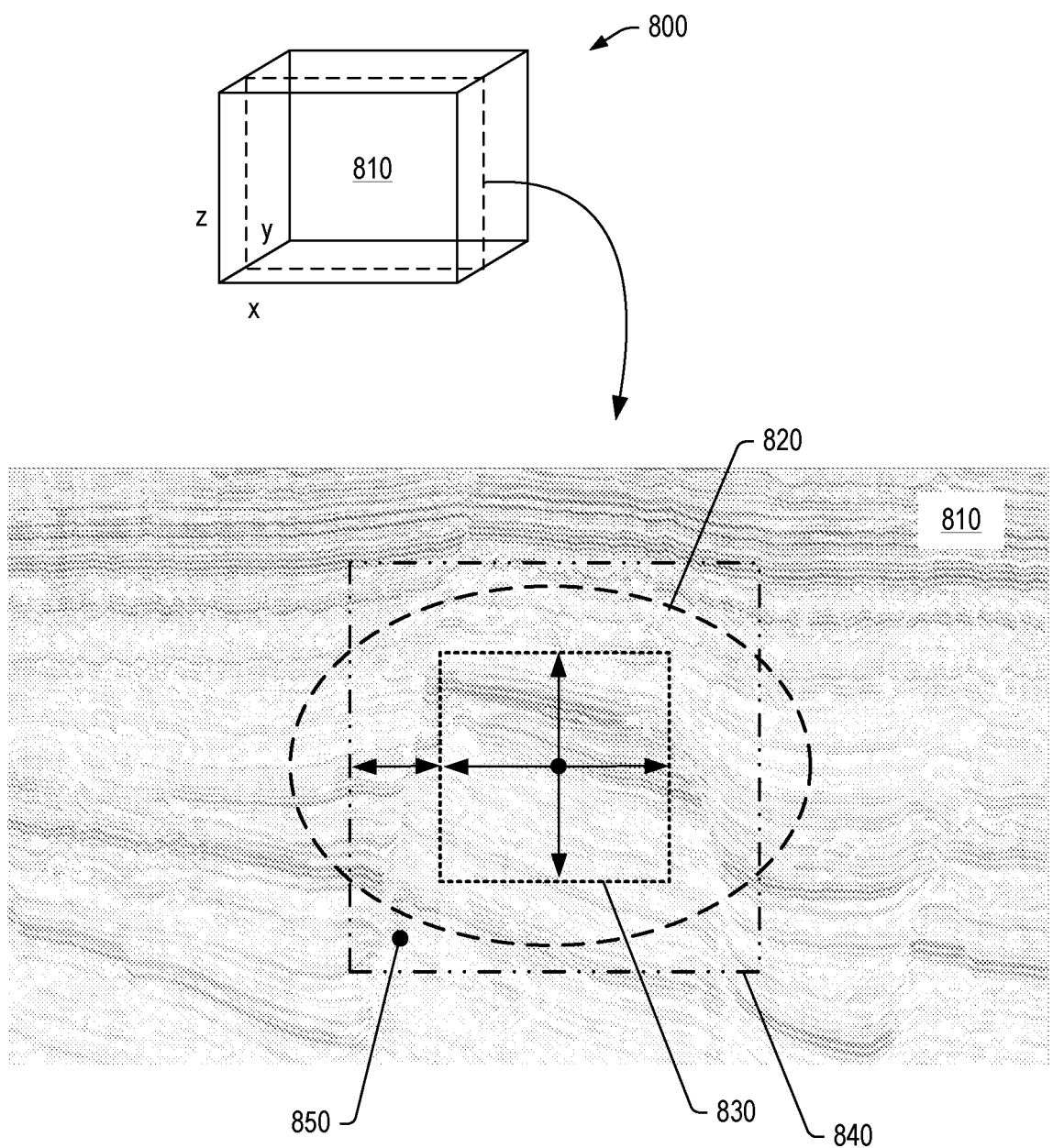
FIG. 8 illustrates an example of a seismic volume and an example of a slice.

FIG. 8 shows an example of a seismic volume 800 and a slice 810 where the slice includes a region of interest 820 that is somewhat centered in the seismic volume 800. In the example of FIG. 8, the slice 810 is rendered using a grayscale that has been converted from a blue-white-red color scheme. As such, the slice 810 lacks the distinctions between lowest and highest amplitudes, as represented using red and blue. However, structural features remain present in the rendering of the slice 810.

In FIG. 8, the slice 810 is an entire slice that spans the dimensions of the seismic volume along x and z directions (e.g., a planar slice in an x, z-plane). Such a slice may take a substantial amount of time to load. As shown in the slice 810, the upper portions of the slice 810 are relatively uninteresting (e.g., relatively horizontal layers). Additionally, in moving outward from the region of interest 820, the Earth layers are also relatively less interesting compared to the region of interest 820.

As explained, a user may request a center portion of a center slice. For example, consider a user requesting a portion of the slice 810 that includes a portion of the region of interest 820. In the example of FIG. 8, a box 830 is shown as being a portion of the slice 810, which can be a portion requested by a user of a computing device. As shown, the box 830 includes some interesting structural features, as may be expected from a well-planned seismic survey. As explained, a method can provide for intelligent loading of additional seismic data from the seismic volume 800.

As an example, the seismic data in the box 830 can be analyzed using a metric and/or to derive a metric. For example, consider a dip metric that can cause loading along a dip direction, which can be downward toward the right and upward toward the left.

As an example, a method may implement a technique that utilizes various parameters. For example, let xmax be the dimension of a seismic volume along the x axis, let ymax be the dimension of the seismic volume along the y axis, let midx be defined as ((xmax))/2, let midy be defined as ((ymax))/2, and let zmax be a seismic volume dimension along z axis. In such an example, further let s be the side of a smaller volume section to be viewed initially, so the coordinate of the initial seismic volume is given as (midx−s/2, midx+s/2, midy−s/2, midy+s/2, 0, zmax). In such an example, the seismic volume can be loaded outward by a factor of s at each iteration (e.g., time) until the entire seismic volume is loaded (e.g., or until a condition is met, an instruction is received, etc.).

With respect to the example of FIG. 8, consider the box 830 being the center of the seismic volume 800. As shown in FIG. 8, an expansion by the factor s can select additional seismic data for loading. For example, the box 830 can be loaded followed by additional seismic data as can be defined by the box 830 and a box 840. As shown, the boxes 830 and 840 can define a frame 850 about the box 830 where the frame 850 can include frame dimensions. For example, the frame can include a left side dimension (see, e.g., double headed arrow), a right side dimension, a bottom side dimension and a top side dimension. As explained, where bottom is prioritized over top, the bottom portion of the frame 850 may be loaded prior to the top portion of the frame 850. As an example, a frame may be defined where it is limited in one or more directions such as, for example, a top direction can be limited such that it is of a lesser priority than one or more other directions. In the example of FIG. 8, a series of boxes, frames, etc., can be determined and utilized for loading until, for example, the entire slice 810 is loaded.

As an example, where a user is viewing a rendering that may be in a perspective view (e.g., a 3D view), loading may expand in a direction that is orthogonal to a slice, for example, to an adjacent slice (or adjacent slices).

As mentioned, often data of greater interest is present in a lower half of a seismic volume such that a method can include loading of a lower half before loading of an upper half. As an example, a seismic volume can be loaded from the middle to bottom of the seismic volume and then to the top.

As an example, a method can implement a slice analysis for purposes of loading. For example, one or more slices of a seismic volume can be used to determine a certain heuristic where such one or more slices can be treated as one or more 2D images where a method can include applying one or more image processing algorithms to determine an interesting portion of a seismic volume.

As an example, consider a method that receives a request to load a portion of a seismic volume where the seismic volume has dimensions of 13885×8497×1876, which includes 221,332,065,220 seismic data values. Where each seismic data value is 32 bits, the seismic volume can be 7,082,626,087,040 bits, which is approximately 0.8 terabytes (TB).

As to throughput to move 1 TB in time, consider: 1 minute demanding a transfer rate of 133.33 Gbps; 5 minutes demanding a transfer rate of 26.67 Gbps; 20 minutes demanding a transfer rate of 6.67 Gbps; and 60 minutes demanding a transfer rate of 2.22 Gbps (e.g., 2,220 Mbps). As a point of reference, consider a relatively fast residential Internet service that provides so-called "gigabit" speed, which can be approximately 1 Gbps. As to another point of reference, consider the 5G standard, the 5G specification calls for at least 20 Gbps downlink and 10 Gbps uplink per mobile base station, which is the total amount of traffic that can be handled by a single cell. In theory, a fixed wireless broadband user might get speeds close to those of the specification with 5G, if that user has a dedicated point-to-point connection. Otherwise, for multiple users, the 20 Gbps downlink will be split between users on the single cell. For a single user with 20 Gbps, a 1 TB seismic volume may be loaded in more than 5 minutes and less than 20 minutes.

As an example, consider a facility that includes a dedicated 5G cell with a number of users such as, for example, 10 interpreters. In such an example, the 10 interpreters, if sharing the capacity of the single dedicated 5G cell, may be able to have about 2 Gbps, which as mentioned, may take approximately 60 minutes to load a 1 TB seismic volume. In such an example, the interpreters (e.g., users) may be provided with workstations and/or mobile devices. As an example, a mobile device may benefit from a method that employs intelligent loading such that the 60 minutes for a 1 TB seismic volume example can be utilized effectively where a region of interest is loaded in a prioritized manner, which can be performed automatically using a back-end computational framework.

As an example, a browser application can include instructions executable locally and/or via one or more application programming interface (API) calls to automatically determine a loading scheme that prioritized loading of portions of a seismic volume. For example, consider an API call to a back-end (e.g., a server) that has header information for a seismic volume. In response, a front-end (e.g., client device) can receive the information and/or receive a prioritized set of loading request instructions. In such an example, the front-end may issue the loading request instructions in a particular order, which may be automatically issued and/or responsive to rendering and/or other actions being performed on the front-end computing device.

As an example, a determined loading order may be independent of bandwidth of a communication network where loading per the loading order may be controlled based at least in part on bandwidth. For example, consider a 4G computing device versus a 5G computing device where the 5G computing device may issue requests and/or receive portions in lesser time due to 5G being of a higher bandwidth than 4G (e.g., assuming an available amount of bandwidth for the computing devices).

While polygons such as rectangles are mentioned, one or more shapes may be utilized for purposes of analysis, loading, rendering, etc. For example, where a feature of interest may be central or otherwise identified, a method may utilize one or more of ellipsoidal, cuboidal, spherical, spiral or another shape. As an example, where a feature of interest is not provided or identified, a default may commence from a center of a seismic volume.

Figure 9:
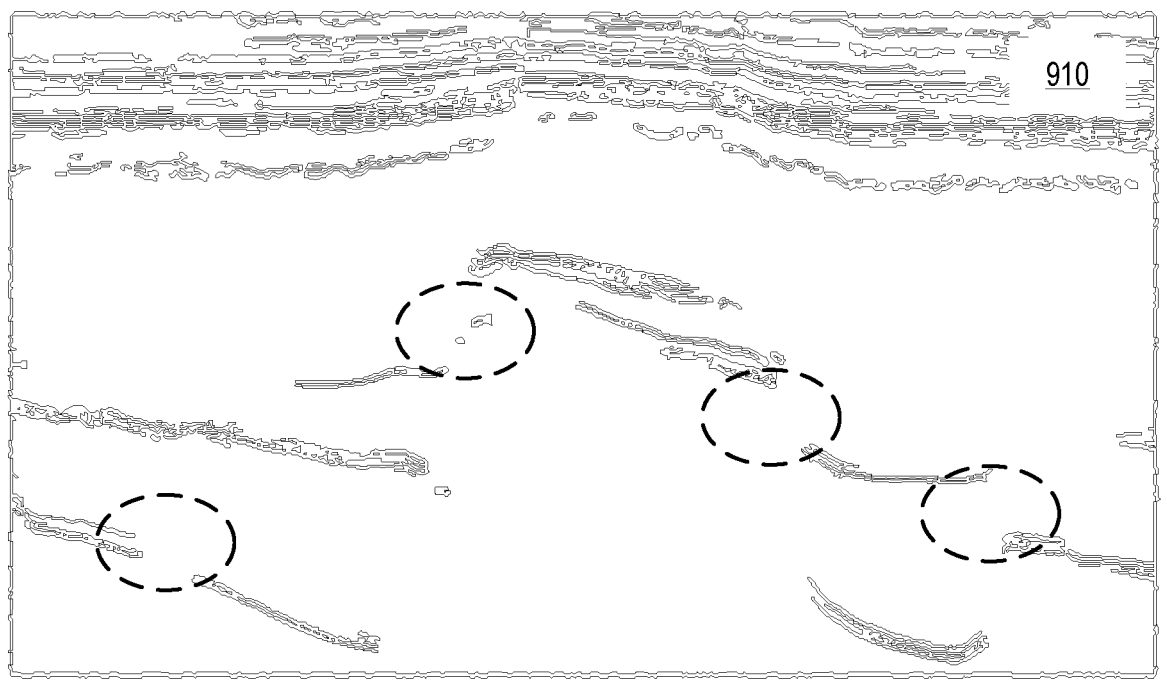
FIG. 9 illustrates an example of a processed slice.

FIG. 9 shows an example of a slice 910 processed using an edge detection algorithm (e.g., an edge detection filter, etc.). In the example of FIG. 9, the edge detection algorithm is a Canny edge detection algorithm, which can include applying a Gaussian filter to smooth an image to reduce noise, identifying intensity gradients of the image, applying non-maximum suppression to reduce spurious responses to edge detection, applying a double threshold to determine potential edges, and tracking edges by hysteresis. Such an algorithm can include finalizing detection of edges by suppressing other edges that may be determined to be weak and/or not connected to strong edges (e.g., using one or more criteria, etc.). As an example, a filter may be applied using a kernel. For example, consider an edge detection algorithm that utilizes a particular kernel, which may be 1D, 2D or 3D.

As an example, a method can include, after applying an edge detection filter, disregarding one or more portions of a slice (e.g., top one third, etc.), which may be a portion or portions where interest does not exist or interest is relatively low.

In FIG. 9, various ovals are shown in dashed lines that correspond to interesting features that can be identified in the results from the edge detection filtering. In the example of FIG. 9, the interesting features include those based on a criterion as to discontinuity of lines. As an example, a criterion can be a metric. As also shown in FIG. 9, identification can be for steep and/or vertical edges (e.g., slopes, dips, etc.) according to one or more criteria (e.g., one or more metrics, etc.). As explained, once identification has been performed to identify one or more features, such one or more features may be utilized for loading subsequent slices of that seismic volume.

As mentioned, a disorder metric may be utilized for loading. For example, consider a disorder metric as presented in an article by Chopra and Marfurt, entitled "Understanding the seismic disorder attribute and its applications", The Leading Edge, pp. 936-943, August 2016, which is incorporated by reference herein.

While reflections associated with conformal sedimentary layers may be coherent and continuous, other reflections, such as mass-transport complexes, karst collapse, and salt, may appear to be quite chaotic, without specific orientation(s). Chaotic events may be events that have little to do with target geology but rather are artifacts due to variations in the overburden and surface or budget limitations resulting in a suboptimum acquisition program. While some of these artifact issues can be handled at the time of processing, a certain level of randomness remains in most seismic data volumes. Geologic features of interpretational interest, such as fault damage zones, unconformities, and gas chimneys, may have randomness associated with them. As to randomness, techniques can include cross correlation which measures randomness associated with noise, where a chaos attribute may be based on an eigen-analysis of gradient covariance and where a seismic disorder attribute may be based on application of second derivative operators in three axial directions in a seismic volume. As an example, a seismic disorder attribute can be a useful attribute for assessing signal-to-noise ratio and data quality, in addition to helping delineate damage zones associated with large faults and interior of a salt dome structure. By construction, a disorder attribute can have a low response to sharp faults and coherent reflectors, but a higher response to more diffuse fault zones and incoherent reflectors. Structure-oriented filtering may be applied to enhance such damage zones.

As an example, a disorder metric can be computed to provide for identification of a fault in a single slice. In such an approach, based on the location of the identified fault in the single slice, a loading order can be determined and implemented, for example, for loading of additional slices.

Figure 10:
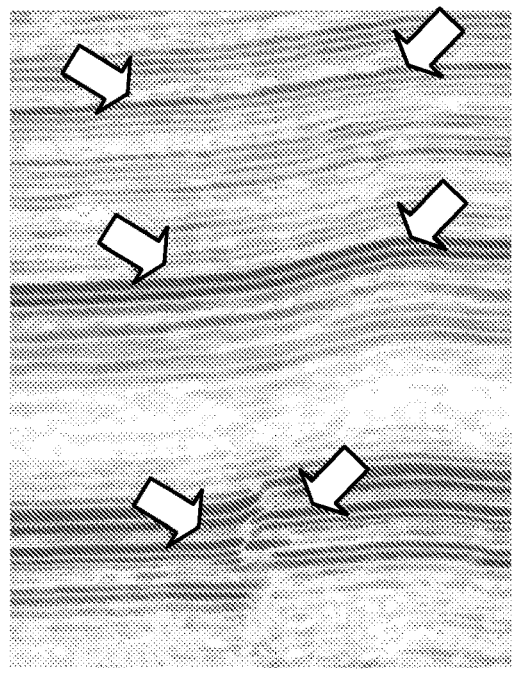
FIG. 10 illustrates an example of a slice and an example of an attribute slice.
Figure 10:
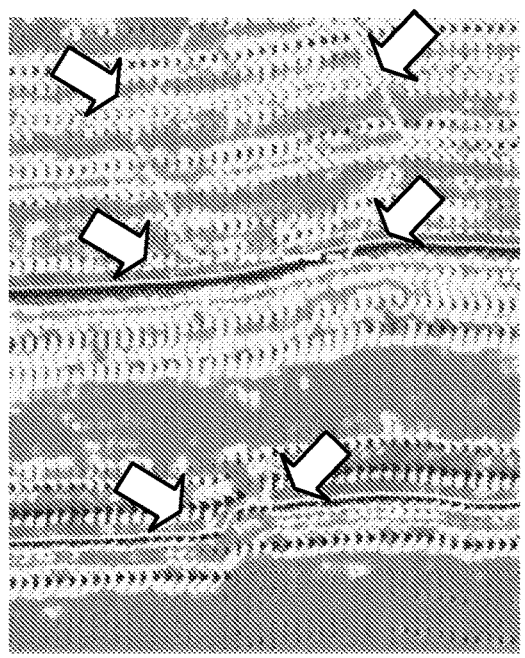

FIG. 10 shows an example of an image 1010 as a seismic slice and an example of a disorder metric image 1030 as a processed seismic slice. In the examples of FIG. 10, different schemes are utilized for rendering. For example, the image 1010 is a grayscale image while the image 1030 is a hybrid image that includes representations of traces (e.g., trace wiggles). As shown, the disorder metric can be utilized for identifying various features.

Specifically, the image 1010 is a portion of an inline aligned slice from a seismic volume where, at the location of the fault indicated with the lowermost set of arrows, the seismic amplitudes are not expected to be coherent; whereas, for the other sets of arrows, just above the horizons, it may be difficult to ascertain the disorder or the entropy. As to the image 1030, it is a processed image of the image 1010 where trace wiggles and variable area are overlaid from a GLCM entropy attribute volume where higher values of disorder may be shown using a color scheme. At the location of the fault indicated by the lowermost set of arrows, the entropy is quite high as expected; whereas, at the other sets of arrows, just above the horizons, the entropy is higher and is open for interpretation. In the image 1030, each fourth trace has been plotted for the seismic data overlay.

As explained in the image 1010, places marked with arrows are possible places with faults in a seismic volume. By applying a disorder metric (e.g., a filter, an attribute process, etc.) across the slice and normalizing it, a method can determine disorder values across slices as shown in the image 1030 where higher values of the disorder metric represent increased chances of having faults. Based on the region with higher disorder metric in such a slice, one or more additional slices can be loaded (e.g., according to a determined loading order, loading on the fly, etc.).

As explained, loading data of several hundred gigabytes or more can take seconds to minutes. As an example, a method can provide for loading in an intelligent manner, which may be customizable depending on one or more factors (e.g., seismic volume, network, device, etc.). In comparison, an unintelligent manner of loading may commence in a fixed manner with an upper corner position, which may be of little interest to an interpreter and waste time; thereby detrimentally impacting user experience.

As an example, a method can include identifying one or more features and/or factors and prioritizing loading of interesting portions of a seismic volume, which may be portions that include features such as, for example, faults and traps. As explained, a method can utilize and/or identify one or more heuristics for determining portions of a seismic volume that are more interesting and load those prior to loading portions of lesser interest.

As an example, a method can be implemented in a manner that aims to keep a user's interest. For example, as mentioned, a loading scheme can provide an animation-like experience where movements as to expanding portions of a seismic volume rendered to a display inherently attract a user's attention. Additionally, the loading order itself can convey information to a user as the loading order can be based on an analysis as to what may be of interest (e.g., from a machine-based approach and/or from input from a user that can be utilized to determine a loading order). Further, as a user may be "fresher" at the beginning of a session, particularly considering eye-strain, the user may utilize that "freshness" to interpret more interesting portions of a seismic volume.

An article by Atwal et al., entitled "Health Issues among Radiologists: Toll they Pay to their Profession", Journal of Clinical and Diagnostic Research: Jcdr. 2017 April; 11(4): TM01-TM02. DOI: 10.7860/JCDR/2017/17023.9537, is incorporated by reference herein, and describes various types of health issues faced by radiologists. In various instances, an interpreter of seismic data may face one or more of such issues.

As an example, an interpreter may experience asthenopia or eye strain, which can adversely affect working efficiency as it transiently reduces the visual perception abilities and thus deteriorates interpretation abilities and work output. In assessing visual strain, Atwal et al. note length of a working period as the strongest risk factor; noting that taking a break at least each hour can reduce the risk of eye strain, though the length of break was not a factor. As to visual acuity, it can be a factor for accurate identification of structural features in a seismic image.

Another issue can be musculoskeletal symptoms ranging from low backache to more severe neuromuscular symptoms (e.g., generally computer back or neck syndrome). Inappropriate posture like hunching of back while reporting, long hours of sitting without breaks, lack of stretching etc., can contribute to these symptoms.

In various implementations, a method that implements intelligent loading may help to reduce various interpreter issues and/or improve interpreter performance. As an example, a method can include issuing one or more notifications during a loading process. For example, where loading occurs over a period of time greater than approximately 20 minutes, a notification may be issued for an interpreter to gaze 20 feet away for 20 seconds (e.g., approximately 6 meters away for 20 seconds), which may help to reduce eye strain and asthenopia. As an example, a method can include loading into local memory while halting rendering such that an interpreter is "forced" to take a break. For example, a method can include loading null data that causes a display to go to a uniform black or a soothing color (e.g., light blue) for a period of time (e.g., 20 seconds) such that an interpreter is forced to take a break. As mentioned, during such a break, a method can continue loading such that a local device can store data in memory (e.g., to RAM, to a local drive, etc.). Such an approach can aim to further improve an interpreter's performance.

Figure 11:
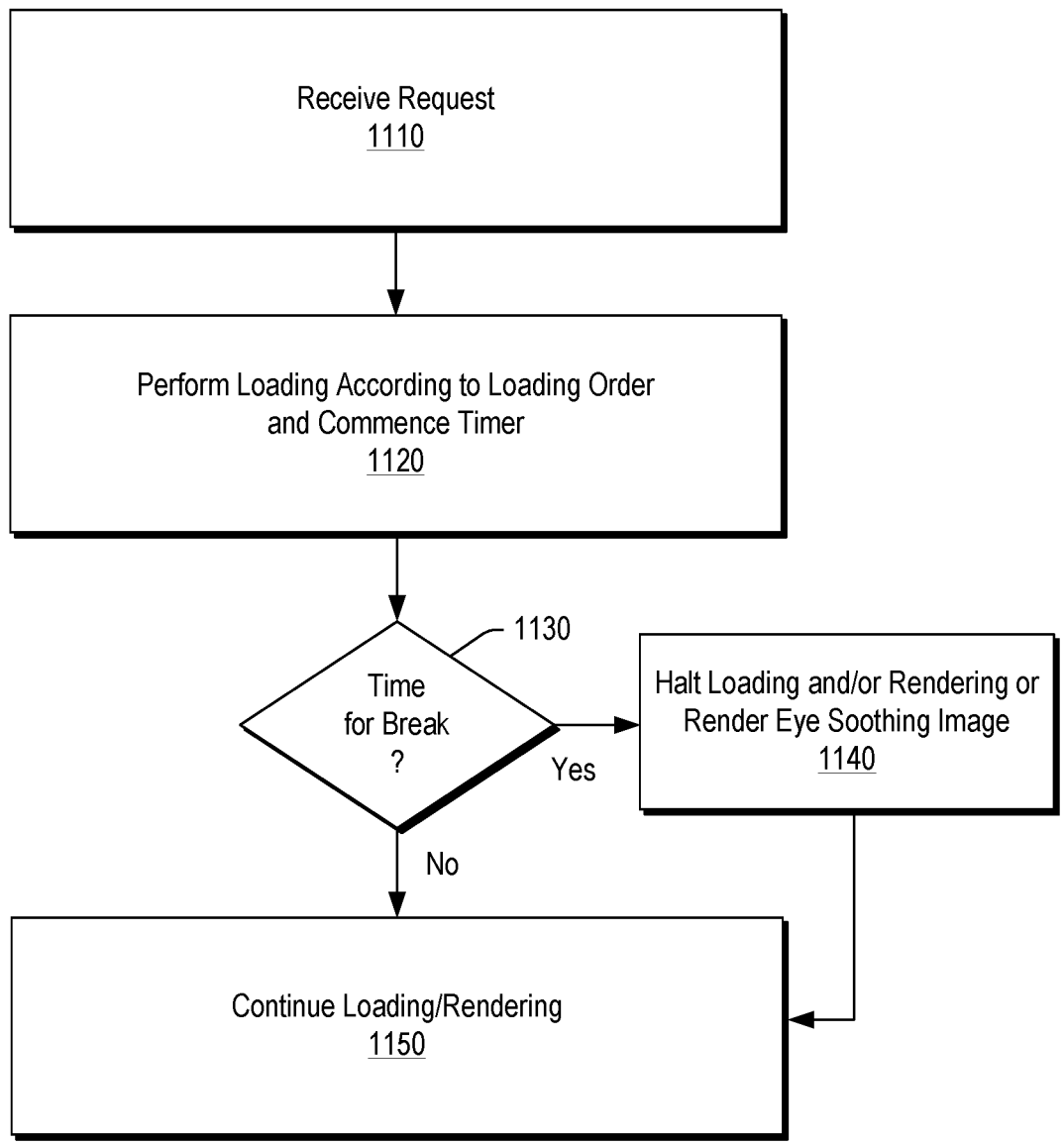
FIG. 11 illustrates an example of a method.

FIG. 11 shows an example of a method 1100 that includes a reception block 1110 for receiving a request for seismic data of a seismic volume, a performance block 1120 for performing loading according to a loading order and for commencing a timer, a decision block 1130 for deciding whether to call for a break according to a time of the timer, a halt block 1140 for halting loading and/or rendering or for rendering an eye soothing image, and a continuation block 1150 for continuing loading and rendering of seismic data of the seismic volume according to the loading order.

As shown, where the decision block 1130 decides that a break is to be taken, the method 1100 can continue to the halt block 1140. In such an example, one or more actions may be taken by a computational framework that is a back-end (e.g., a server, etc.) and/or one or more actions may be taken by a computing device that is a front-end (e.g., a client device). Once the break time has expired, the method 1100 can continue to the continuation block 1150. As mentioned, a break time may provide for loading seismic data into memory (e.g., RAM, a storage drive, etc.) during the break time where, for example, rendering may be performed at a faster rate (e.g., for a period of time) than prior to the break time as un-rendered seismic data can be available locally. As mentioned, a graphic control may be part of a GUI that can allow a user to control a rendering rate, which can provide for an animation effect (e.g., an expanding spatial region).

Figure 12:
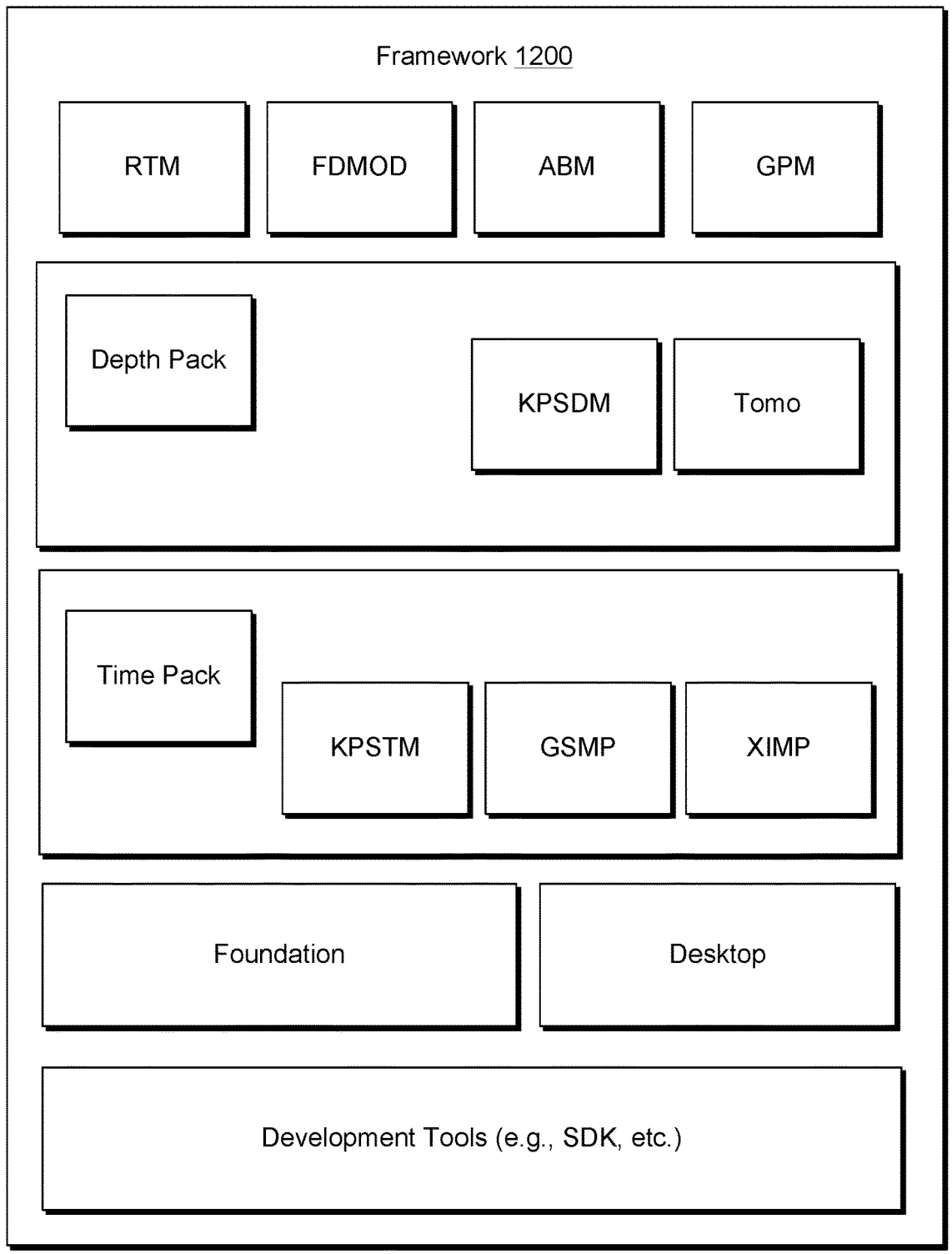
FIG. 12 illustrates an example of a framework.

FIG. 12 shows an example of a computational framework 1200 that can include one or more processors and memory, as well as, for example, one or more interfaces. The computational framework of FIG. 12 can include one or more features of the OMEGA framework (Schlumberger Limited, Houston, Texas), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 12, the computational framework 1200 includes features for RTM, FDMOD, adaptive beam migration (ABM), Gaussian packet migration (GPM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

As an example, the computational framework 1200 can include one or more intelligent loading. For example, consider an intelligent loading component that can respond to one or more requests, for example, to perform a method such as, for example, the method 600 of FIG. 6, the method 1100 of FIG. 11, etc.

Figure 13:
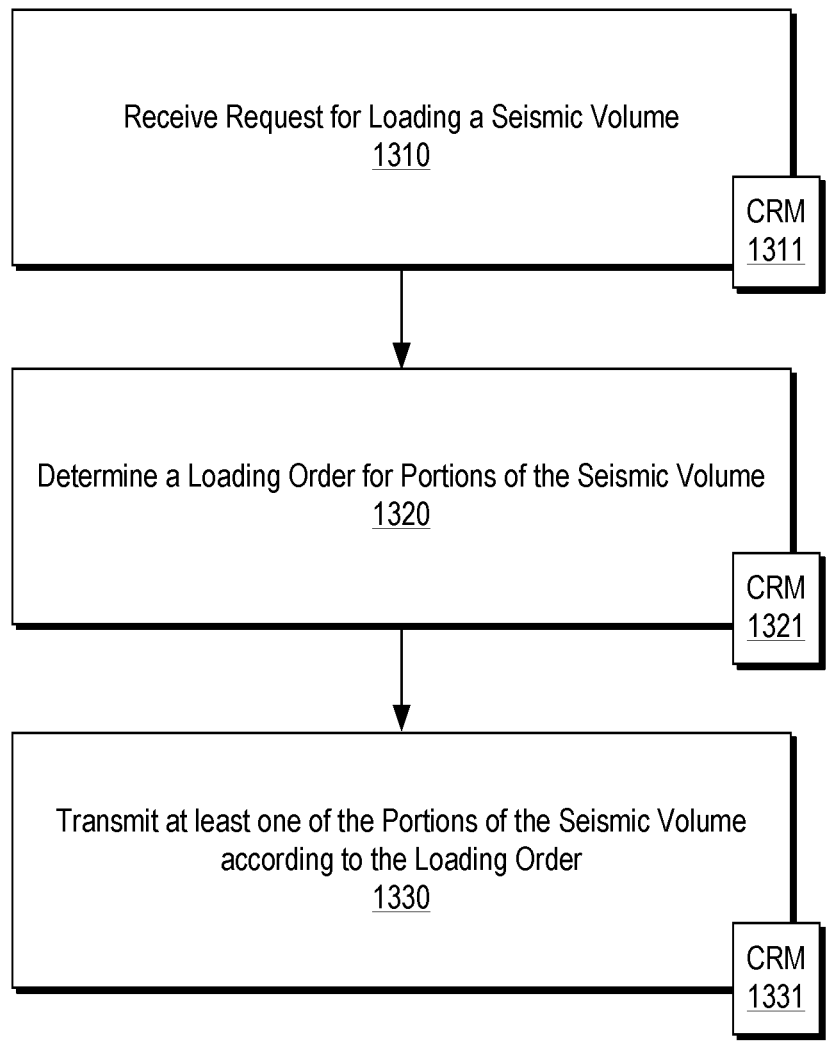
FIG. 13 illustrates an example of a method.

FIG. 13 shows an example of a method 1300 that can include a reception block 1310 for receiving a request for loading a seismic volume; a determination block 1320 for determining a loading order for portions of the seismic volume, where the loading order prioritizes an interior portion of the seismic volume over a boundary portion of the seismic volume; and a transmission block 1330 for transmitting, via a network interface, at least one of the portions of the seismic volume according to the loading order.

The method 1300 is shown in FIG. 13 in association with various computer-readable media (CRM) blocks 1311, 1321, and 1331. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1300. As an example, a CRM block can be a computer-readable storage medium that is non-transitory, not a carrier wave and not a signal. As an example, such blocks can include instructions that can be stored in memory and can be executable by one or more of processors.

As an example, a method such as the method 1300 of FIG. 13 may be implemented as part of a framework such as the OMEGA framework. The method 1300 of FIG. 13 may include one or more of the blocks of the method 600 of FIG. 6 and/or the method 1100 of FIG. 11.

As an example, a visualization process can implement one or more of various features that can be suitable for one or more web applications. For example, consider use of the JAVASCRIPT object notation format (JSON) and/or one or more other languages/formats. As an example, a framework may include one or more converters. For example, consider a JSON to PYTHON converter and/or a PYTHON to JSON converter.

As an example, a system may utilize one or more types of application programming interfaces (APIs). For example, a request an application sends to a cloud storage JSON application programming interface (API) can be processed for authorization to identify the application to the cloud platform, which may occur in using an OAuth 2.0 token (which also authorizes the request) and/or using the application's API key.

As an example, if a request demands authorization (such as a request for private data), then the application is to provide an OAuth 2.0 token with the request; noting that the application may also provide the API key. As an example, if a request does not demand authorization (e.g., a request for public data), then no identification is demanded; however, the application may still provide the API key, an OAuth 2.0 token, or both. An application in the GOOGLE CLOUD platform can use OAuth 2.0 to authorize requests.

OAuth 2.0 provides for tokens and token management. For example, consider token introspection (see, e.g., RFC 7662), to determine the active state and meta-information of a token, token revocation (see, e.g., RFC 7009), to signal that a previously obtained token is no longer needed, and JAVASCRIPT object notation (JSON) Web Token (JWT) (see, e.g., RFC 7519).

As an example, system may include one or more types of APIs for accessing data, processing data, rendering data, determining a loading order, etc. As an example, an API may be a Representational State Transfer (REST) API, which may be of a style that defines a set of constraints to be used for creating services. Services that conform to the REST architectural style, termed RESTful web services, provide interoperability between computer systems on the Internet, a cloud platform, etc. RESTful web services can allow one or more requesting systems to access and manipulate textual representations of web resources by using a uniform and predefined set of stateless operations. As an example, one or more other kinds of web services may be utilized (e.g., such as SOAP web services) that may expose their own sets of operations.

As an example, an HTTP-based RESTful API may be defined with the following aspects: a base URI, such as http://api.example.com/; a standard HTTP methods (e.g., GET, POST, PUT, and DELETE); a media type that defines state transition data elements (e.g., Atom, microformats, application/vnd.collection+json, etc.). A current representation can tell a client how to compose requests for transitions to next available application states, which may be via a URI, a JAVA applet, etc.

RESTful implementations can make use of one or more standards, such as, for example, HTTP, URI, JSON, and XML. As an example, an API may be referred to as being RESTful, though it may not fulfil each architectural constraint (e.g., uniform interface constraint, etc.).

As an example, one or more features of the computational framework 1200 may be accessed using an API or APIs. As an example, a workflow can include accessing another workflow, where such workflows may utilize different computational frameworks. As an example, a method may act to assure that data that may be or include proprietary and/or otherwise restricted data (e.g., seismic data, etc.) is properly handled with authority. As an example, where a seismic volume includes different types of security measures that may restrict resolution, spatial regions, access, access rate, such types may be taken into consideration when determining loading (e.g., a loading order, etc.).

As an example, a system may be at least in part cloud-based. For example, a cloud platform may include compute tools, management tools, networking tools, storage and database tools, large data tools, identity and security tools, and machine learning tools. As an example, a cloud platform can include identity and security tools that can provide a key management service (KMS) tool. Key management can provide for management of cryptographic keys in a cryptosystem, which can include task associated with the generation, exchange, storage, use, crypto-shredding (destruction) and replacement of keys. It can include cryptographic protocol design, key servers, user procedures, and other relevant protocols. As an example, a system may include features of one or more cloud platforms (e.g., GOOGLE CLOUD, AMAZON WEB SERVICES CLOUD, AZURE CLOUD, etc.). As an example, the DELFI cognitive exploration and production (E&P) environment may be implemented at least in part in a cloud platform.

As an example, a cloud platform may provide for object storage, block storage, file storage (e.g., a shared filesystem), managed SQL databases, NoSQL databases, etc. As to types of data, consider one or more of text, images, pictures, videos, audio, objects, blobs, structured data, unstructured data, low latency data, high-throughput data, time series data, semi-structured application data, hierarchical data, durable key-value data, etc. For example, particular data may be utilized in visual renderings and demand low latency such that glitches do not occur during buffering, rendering, interactive manipulations, etc. As an example, particular data may be generated as a binary large object (blob) for purposes of transmission, security, storage organization, etc. As an example, a sensor (e.g., a seismic sensor, which may be a seismic receiver, etc.) may generate time series data, which may be regular and/or irregular in time and which may or may not include a "global" time marker (e.g., time stamps, etc.). As an example, data may be in a wellsite information transfer standard markup language (WITSML) standard, which is a standard utilized in various operations including rig operations. As an example, data may be serially transferred ASCII data.

As an example, one or more machine learning tools may be utilized for training a machine learning model and/or using a machine learning (ML) model. As an example, a trained ML model (e.g., a trained ML tool that includes hardware, etc.) can be utilized for one or more tasks. As an example, various types of data may be acquired and optionally stored, which may provide for training one or more ML models, for retraining one or more ML models, for further training of one or more ML models, and/or for offline analysis, etc.

As an example, an earth model such as a multidimensional model of a volume where at least some seismic data have been acquired may be utilized in a method that involves loading of seismic data. In such an example, the earth model may be utilized in combination with a ML model, for example, to help determine one or more loading parameters, processing parameters, rendering parameters, etc.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California). As an example, a loading process may utilize one or more machine learning model-based techniques. As an example, an image recognition approach may be utilized in determining a loading order for loading a seismic volume where, for example, features, regions, etc., can be associated with corresponding data rates, data amounts, data times, etc., which may facilitate one or more types of workflows that can enhance user experience (e.g., reduce time, reduce eyestrain, etc.).

As an example, a method can include receiving a request for loading a seismic volume; determining a loading order for portions of the seismic volume, where the loading order prioritizes an interior portion of the seismic volume over a boundary portion of the seismic volume; and transmitting, via a network interface, at least one of the portions of the seismic volume according to the loading order. In such an example, the portions can be two-dimensional portions. For example, consider two-dimensional portions that can be defined at least in part to correspond to a depth direction and an inline direction of a seismic survey or a crossline direction of a seismic survey.

As an example, a loading order can be based on initially loading a central portion of a seismic volume. For example, consider a loading order that specifies subsequent, sequential loading of additional portions that are adjacent to the central portion of the seismic volume.

As an example, a method can include determining a loading order that includes applying a filter to a slice of a seismic volume to generate a filtered slice of the seismic volume. In such an example, the method can include identifying a feature of interest in the filtered slice of the seismic volume and determining the loading order in a direction based at least in part on a direction of the feature of interest. As an example, a feature of interest can be or include a dipping feature characterized by a dip direction. For example, consider a feature of interest that includes a fault characterized by a fault direction.

As an example, a method can include determining a loading order that involves performing an image analysis on a slice of a seismic volume to identify a feature, where the loading order prioritizes portions of the seismic volume that include the feature over portions of the seismic volume that do not include the feature.

As an example, a method can include determining a loading order that involves computing attribute values for a slice of a seismic volume to generate an attribute slice. In such an example, the attribute values can include disorder attribute values.

As an example, a method can include determining a portion size. For example, consider a portion size that depends on bandwidth of a network operatively coupled to the network interface.

As an example, a method can include utilizing a counter to implement a break for reducing eye-strain at a remote display.

As an example, a method can include accessing a seismic volume that is stored in a data storage device, where the seismic volume has a data size in excess of 100 gigabytes.

As an example, a method can include, prior to transmitting, processing each of various portions to conform to a display scheme, where the transmitting transmits at least one of the various portions as a processed portion. For example, consider a display scheme that is a gradational display scheme.

As an example, a system can include a processor; memory operatively coupled to the processor; a network interface; and processor-executable instructions stored in the memory to instruct the system to: receive a request for loading a seismic volume; determine a loading order for portions of the seismic volume, where the loading order prioritizes an interior portion of the seismic volume over a boundary portion of the seismic volume; and transmit, via the network interface, at least one of the portions of the seismic volume according to the loading order.

As an example, one or more computer-readable storage media can include processor-executable instructions to instruct a computing system to: receive a request for loading a seismic volume; determine a loading order for portions of the seismic volume, where the loading order prioritizes an interior portion of the seismic volume over a boundary portion of the seismic volume; and transmit, via the network interface, at least one of the portions of the seismic volume according to the loading order.

As an example, a computer program product can include computer-executable instructions to instruct a computing system to perform one or more methods such as, for example, one or more of the methods of FIG. 5, FIG. 6, FIG. 11, FIG. 13, etc.

Figure 14:
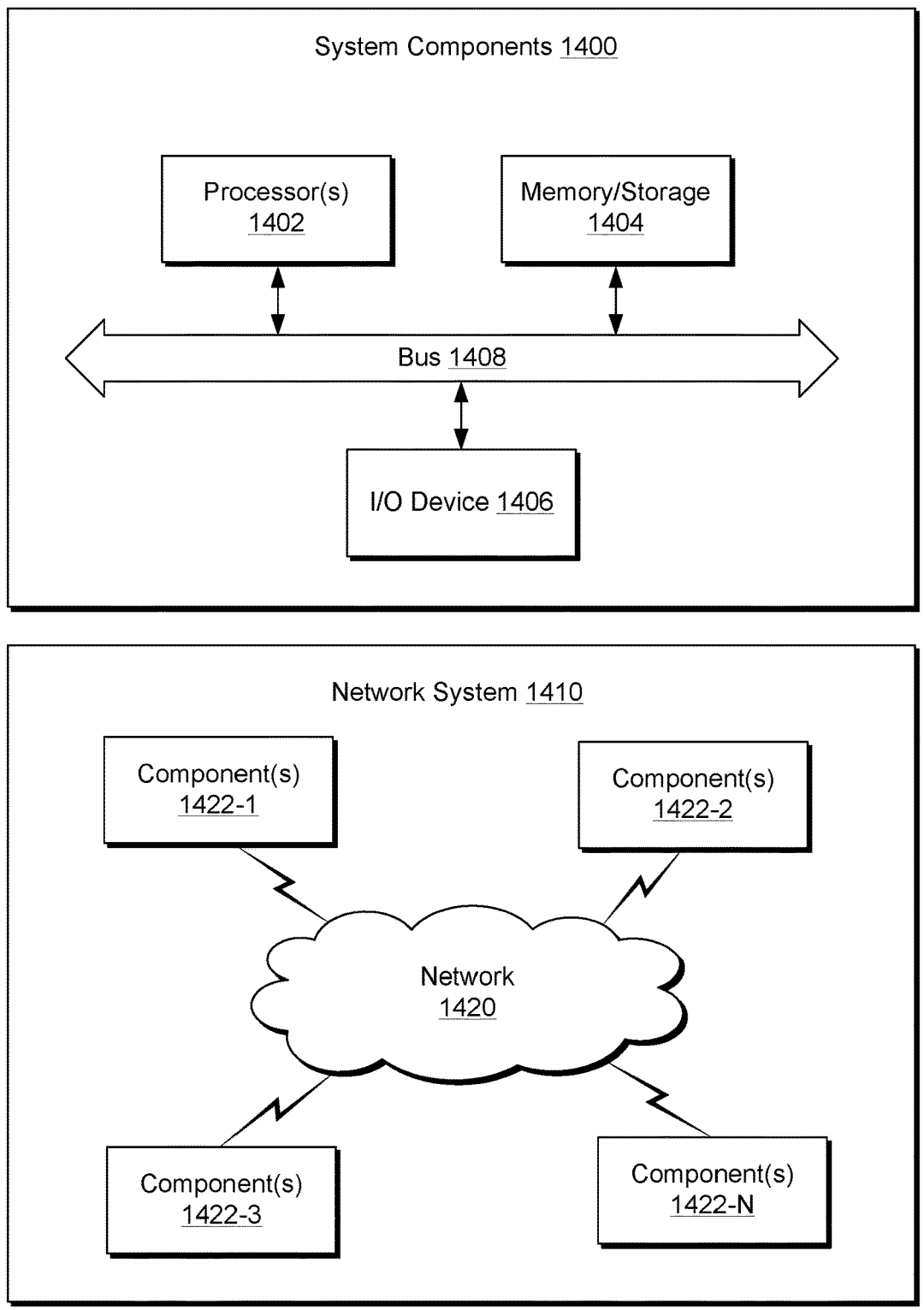
FIG. 14 illustrates example components of a system and a networked system.

FIG. 14 shows components of an example of a computing system 1400 and an example of a networked system 1410 that includes a network 1420, which may be utilized to perform a method, to form a specialized system, etc. The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410 that includes a network 1420. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

In varying circumstances, those with skill in the art may also practice the disclosed invention according to any one of the following embodiments.

In varying circumstances, those with skill in the art may also practice the disclosed invention according to the following embodiments.

In an embodiment, a method (1300) is provided, comprising receiving a request for loading a seismic volume (1310); determining a loading order for portions of the seismic volume, wherein the loading order prioritizes an interior portion of the seismic volume over a boundary portion of the seismic volume (1320); and transmitting, via a network interface, at least one of the portions of the seismic volume according to the loading order (1330).

In a further embodiment, the foregoing method (1300) includes wherein the portions are two-dimensional portions.

In a further embodiment, the foregoing methods include wherein the two-dimensional portions are defined at least in part to correspond to a depth direction and an inline direction of a seismic survey or a crossline direction of a seismic survey.

In a further embodiment, the foregoing methods include wherein the loading order is based on initially loading a central portion of the seismic volume, optionally wherein the loading order specifies subsequent, sequential loading of additional portions that are adjacent to the central portion of the seismic volume.

In a further embodiment, the foregoing methods include wherein determining a loading order comprises applying a filter to a slice of the seismic volume to generate a filtered slice of the seismic volume.

In a further embodiment, the foregoing methods include identifying a feature of interest in the filtered slice of the seismic volume and determining the loading order in a direction based at least in part on a direction of the feature of interest.

In a further embodiment, the foregoing methods include wherein the feature of interest comprises a dipping feature characterized by a dip direction, optionally wherein the feature of interest comprises a fault characterized by a fault direction.

In a further embodiment, the foregoing methods include wherein determining a loading order comprises performing an image analysis on a slice of the seismic volume to identify a feature, wherein the loading order prioritizes portions of the seismic volume that include the feature over portions of the seismic volume that do not include the feature.

In a further embodiment, the foregoing methods include wherein determining a loading order comprises computing attribute values for a slice of the seismic volume to generate an attribute slice, optionally wherein the attribute values comprise disorder attribute values.

In a further embodiment, the foregoing methods include determining a portion size, optionally wherein the portion size depends on bandwidth of a network operatively coupled to the network interface.

In a further embodiment, the foregoing methods include utilizing a counter to implement a break for reducing eyestrain at a remote display.

In a further embodiment, the foregoing methods include wherein the seismic volume is stored in a data storage device, wherein the seismic volume has a data size in excess of 100 gigabytes.

In a further embodiment, the foregoing methods include prior to the transmitting, processing each of the portions to conform to a display scheme, wherein the transmitting transmits the at least one portion as a processed portion, optionally wherein the display scheme comprises a gradational display scheme.

In an embodiment, a system (250) is provided, comprising a processor (256); memory (258) operatively coupled to the processor; a network interface (260); and processor-executable instructions (270) stored in the memory to instruct the system to perform the method 1300 or any of the methods described in the foregoing further embodiments.

In an embodiment, a computer program product is provided that comprises computer-executable instructions to instruct a computing system to perform the method 1300 or any of the methods described in the foregoing further embodiments.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving a request for loading a seismic volume, wherein the seismic volume comprises a model of seismic data for a subsurface region based on seismic data, the seismic data being received from downhole equipment, a land-based survey acquisition system, a marine-based survey acquisition system, a plurality of subsurface sensors, or any combination thereof;
determining a loading order for portions of the seismic volume, wherein the loading order prioritizes an interior portion of the seismic volume over a boundary portion of the seismic volume;
transmitting, via a network interface, at least one portion of the portions of the seismic volume according to the loading order;
characterizing the subsurface region based on the at least one portion of the seismic volume;
generating instructions based on the characterization of the subsurface region; and
transmitting the instructions to a downhole tool disposed within the subsurface region, wherein the downhole tool is configured to affect a change in trajectory in response to receiving the instructions.

2. The method of claim 1, wherein the portions are two-dimensional portions.

3. The method of claim 2, wherein the two-dimensional portions are defined at least in part to correspond to a depth direction and an inline direction of a seismic survey or a crossline direction of a seismic survey.

4. The method of claim 1, wherein the loading order is based on initially loading a central portion of the seismic volume.

5. The method of claim 4, wherein the loading order specifies subsequent, sequential loading of additional portions that are adjacent to the central portion of the seismic volume.

6. The method of claim 1, wherein determining a loading order comprises applying a filter to a slice of the seismic volume to generate a filtered slice of the seismic volume.

7. The method of claim 6, comprising identifying a feature of interest in the filtered slice of the seismic volume and determining the loading order in a direction based at least in part on a direction of the feature of interest.

8. The method of claim 7, wherein the feature of interest comprises a dipping feature characterized by a dip direction.

9. The method of claim 8, wherein the feature of interest comprises a fault characterized by a fault direction.

10. The method of claim 1, wherein determining the loading order comprises performing an image analysis on a slice of the seismic volume to identify a feature, wherein the loading order prioritizes portions of the seismic volume that include the feature over portions of the seismic volume that do not include the feature.

11. The method of claim 1, wherein determining the loading order comprises computing attribute values for a slice of the seismic volume to generate an attribute slice.

12. The method of claim 11, wherein the attribute values comprise disorder attribute values.

13. The method of claim 1, comprising determining a portion size.

14. The method of claim 13, wherein the portion size depends on bandwidth of a network operatively coupled to the network interface.

15. The method of claim 1, comprising utilizing a counter to implement a break for reducing eye-strain at a remote display.

16. The method of claim 1, wherein the seismic volume is stored in a data storage device, wherein the seismic volume has a data size in excess of 100 gigabytes.

17. The method of claim 1, comprising, prior to the transmitting, processing each of the portions to conform to a display scheme, wherein the transmitting transmits the at least one portion as a processed portion.

18. The method of claim 17, wherein the display scheme comprises a gradational display scheme.

19. A system comprising:
a processor;
memory operatively coupled to the processor;
a network interface; and
processor-executable instructions stored in the memory to instruct the system to:
receive a request for loading a seismic volume, wherein the seismic volume comprises a model of seismic data for a subsurface region based on seismic data, the seismic data being received from downhole equipment, a land-based survey acquisition system, a marine-based survey acquisition system, a plurality of subsurface sensors, or any combination thereof;
determine a loading order for portions of the seismic volume, wherein the loading order prioritizes an interior portion of the seismic volume over a boundary portion of the seismic volume;
transmit, via the network interface, at least one portion of the portions of the seismic volume according to the loading order;
characterize the subsurface region based on the at least one portion of the seismic volume;
generate instructions based on the characterization of the subsurface region; and
transmit the instructions to a downhole tool disposed within the subsurface region, wherein the downhole tool is configured to affect a change in trajectory in response to receiving the instructions.

20. One or more non-transitory computer-readable storage media comprising processor-executable instructions to instruct a computing system to:
receive a request for loading a seismic volume, wherein the seismic volume comprises a model of seismic data for a subsurface region based on seismic data, the seismic data being received from downhole equipment, a land-based survey acquisition system, a marine-based survey acquisition system, a plurality of subsurface sensors, or any combination thereof;
determine a loading order for portions of the seismic volume, wherein the loading order prioritizes an interior portion of the seismic volume over a boundary portion of the seismic volume;
transmit, via the network interface, at least one portion of the portions of the seismic volume according to the loading order;
characterize the subsurface region based on the at least one portion of the seismic volume;
generate instructions based on the characterization of the subsurface region; and
transmit the instructions to a downhole tool disposed within the subsurface region, wherein the downhole tool is configured to affect a change in trajectory in response to receiving the instructions.

* * * * *